(12) United States Patent
Shinozaki

(10) Patent No.: US 10,650,268 B2
(45) Date of Patent: May 12, 2020

(54) IMAGE PROCESSING APPARATUS AND IMAGE PROCESSING METHOD

(71) Applicant: SONY SEMICONDUCTOR SOLUTIONS CORPORATION, Kanagawa (JP)

(72) Inventor: Katsuya Shinozaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 49 days.

(21) Appl. No.: 15/768,692

(22) PCT Filed: Nov. 2, 2016

(86) PCT No.: PCT/JP2016/082533
§ 371 (c)(1),
(2) Date: Apr. 16, 2018

(87) PCT Pub. No.: WO2017/086156
PCT Pub. Date: May 26, 2017

(65) Prior Publication Data
US 2018/0307937 A1    Oct. 25, 2018

(30) Foreign Application Priority Data

Nov. 17, 2015 (JP) ................ 2015-224925

(51) Int. Cl.
| | |
|---|---|
| *G06K 9/62* | (2006.01) |
| *G06K 9/00* | (2006.01) |
| *H04N 5/232* | (2006.01) |
| *G06T 7/00* | (2017.01) |
| *G06T 7/70* | (2017.01) |
| *G06T 7/60* | (2017.01) |
| *H04N 5/14* | (2006.01) |

(52) U.S. Cl.
CPC ....... *G06K 9/6201* (2013.01); *G06K 9/00362* (2013.01); *G06K 9/00718* (2013.01);
(Continued)

(58) Field of Classification Search
CPC ............. G06K 9/6201; G06K 9/00718; G06K 9/00362; H04N 5/23229; H04N 5/144; G06T 7/97; G06T 7/60; G06T 7/70
(Continued)

(56) References Cited

U.S. PATENT DOCUMENTS

2001/0036316 A1* 11/2001 Kunimasa ............ G06K 9/6814
                                                                  382/181
2002/0191100 A1* 12/2002 Matsunaga ........ H04N 5/23212
                                                                  348/345
(Continued)

FOREIGN PATENT DOCUMENTS

| AU | 2002366985 A1 | 7/2003 |
|---|---|---|
| EP | 1491038 A2 | 12/2004 |

(Continued)

OTHER PUBLICATIONS

International Search Report and Written Opinion of PCT Application No. PCT/JP2016/082533, dated Dec. 6, 2016, 12 pages of ISRWO.

*Primary Examiner* — Amandeep Saini
(74) *Attorney, Agent, or Firm* — Chip Law Group

(57) ABSTRACT

Provided are an image processing apparatus and an image processing method for improving the accuracy of a recognition result of a current object included in captured images. The image processing apparatus performs recognition processing on the current object on the basis of recognition results of the current object obtained from a plurality of captured images with different output information regarding imaging so that the accuracy of the recognition result of the captured images can be improved. For example, the image processing method can be applied to an electronic device having a function of performing the recognition processing on the current object.

10 Claims, 15 Drawing Sheets

(52) U.S. Cl.
CPC ............... *G06T 7/60* (2013.01); *G06T 7/70* (2017.01); *G06T 7/97* (2017.01); *H04N 5/23229* (2013.01); *H04N 5/144* (2013.01)

(58) Field of Classification Search
USPC ........................................................ 382/181
See application file for complete search history.

(56) References Cited

U.S. PATENT DOCUMENTS

| | | | |
|---|---|---|---|
| 2005/0057687 A1 | 3/2005 | Irani et al. | |
| 2012/0027304 A1* | 2/2012 | Brown | G06K 9/00369 |
| | | | 382/190 |
| 2016/0379075 A1* | 12/2016 | Ando | G06K 9/4642 |
| | | | 382/103 |

FOREIGN PATENT DOCUMENTS

| | | | | |
|---|---|---|---|---|
| JP | 07/222158 A | | 8/1995 | |
| JP | 07-222158 A | | 8/1995 | |
| JP | 2003-234931 A | | 8/2003 | |
| JP | 2005-515675 A | | 5/2005 | |
| JP | 2007-329596 A | | 12/2007 | |
| JP | 2008-017259 A | | 1/2008 | |
| JP | 2009-295029 A | | 12/2009 | |
| JP | 2014-180024 A | | 9/2014 | |
| JP | 2015-177300 A | | 10/2015 | |
| JP | 2015177300 A | * | 10/2015 | ........... G06K 9/4642 |
| WO | 2003/060823 A2 | | 7/2003 | |
| WO | 2015/137039 A1 | | 9/2015 | |

\* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/082533 filed on Nov. 2, 2016, which claims priority benefit of Japanese Patent Application No. JP 2015-224925 filed in the Japan Patent Office on Nov. 17, 2015. Each of the above-referenced applications is hereby incorporated herein by reference in its entirety.

TECHNICAL FIELD

The present technology relates to an image processing apparatus, an image processing method and a program, and in particular, to an image processing apparatus, an image processing method and a program which are capable of improving the accuracy of a recognition result of a current object included in captured images.

BACKGROUND ART

Conventionally, a technology for recognizing a subject included in captured images captured by a camera has been proposed (e.g., see Patent Documents 1 and 2).

CITATION LIST

Patent Document

Patent Document 1: Japanese Patent Application Laid-Open No. 2014-180024
Patent Document 2: Japanese Patent Application Laid-Open No. 2008-17259

SUMMARY OF THE INVENTION

Problems to be Solved by the Invention

However, since a sufficient recognition result cannot be obtained by the conventional technologies as a recognition result of a current object included in the captured images, improvement of the accuracy of the recognition result of the current object included in the captured images has been demanded.

The present technology has been made in light of such a situation to be capable of improving the accuracy of the recognition result of the current object included in the captured images.

Solutions to Problems

An image processing apparatus according to one aspect of the present technology is an image processing apparatus including a recognition processing unit which performs recognition processing on a current object on the basis of recognition results of the current object obtained from a plurality of captured images with different output information regarding imaging.

The image processing apparatus according to one aspect of the present technology may be an independent apparatus or may be an internal block configuring one apparatus. Furthermore, an image processing method and a program according to one aspect of the present technology are an image processing method and a program compatible with the image processing apparatus according to one aspect of the present technology described above.

In the image processing apparatus, the image processing method and the program according to one aspect of the present technology, the recognition processing is performed on the current object on the basis of the recognition results of the current object obtained from the plurality of captured images with different output information regarding the imaging.

Effects of the Invention

According to one aspect of the present technology, it is possible to improve the accuracy of the recognition result of the current object included in the captured images.

Note that the effects described herein are not necessarily limited, and any one of the effects described in the present disclosure may be applied.

MODE FOR CARRYING OUT THE INVENTION

Hereinafter, embodiments of the present technology will be described with reference to the drawings. Note that the description will be given in the following order.

1. System Configuration
2. Configuration of Image Processing Apparatus
 (1) First Embodiment: Basic Configuration
 (2) Second Embodiment: Configuration for Performing Recognition Processing Using Recognition Processing Result of Other Series
 (3) Third Embodiment: Configuration for Performing Synthesis Processing According to Timing of the Recognition Processing Result
 (4) Fourth Embodiment: Configuration for Performing Recognition Processing at Timing According to Delay Information
3. Modification Example
4. Computer Configuration 1. System Configuration (Configuration Example of Image Processing System)

Figure 1:
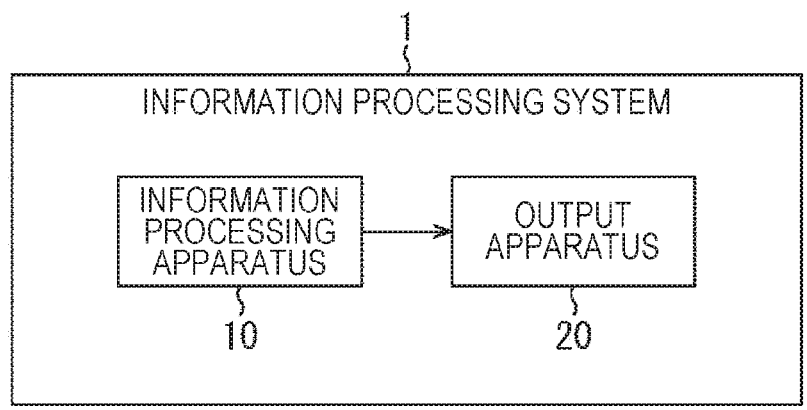
FIG. 1 is a diagram showing a configuration example of an image processing system to which the present technology is applied.

FIG. 1 is a diagram showing a configuration example of an image processing system to which the present technology is applied. Note that the term "system" means a plurality of apparatuses logically gathered.

An image processing system 1 in FIG. 1 is a system which performs recognition processing on a current object (object) included in captured images and outputs information corresponding to the recognition processing result.

For example, the image processing system 1 can be used as a surveillance camera system to perform recognition processing on a current object included in captured images captured by a surveillance camera. Moreover, for example, the image processing system 1 can be used as an electronic device having an imaging function and a recognition processing function of the captured images, such as a mobile phone, a smartphone, a tablet terminal apparatus or a glasses type device. Furthermore, the image processing system 1 may be used as an in-vehicle device mounted on a vehicle.

In FIG. 1, the image processing system 1 is configured with an image processing apparatus 10 and an output apparatus 20.

The image processing apparatus 10 has a plurality of imaging units (solid-state imaging elements) and performs recognition processing on captured images with different output information regarding imaging (e.g., resolutions, frame rates and the like of the captured images) for each series of these imaging units. At this time, in the recognition processing of a certain series (e.g., a first series), the recognition processing result of the recognition processing of other series (e.g., a second series) is used. However, the captured images are, for example, image frames generated (acquired) in time series.

The recognition processing results obtained by the recognition processing of the image processing apparatus 10 are supplied to the output apparatus 20 as recognition information. The output apparatus 20 outputs the recognition information supplied from the image processing apparatus 10. For example, the output apparatus 20 displays a picture (the recognition processing result of the current object) corresponding to the recognition information from the image processing apparatus 10.

The configuration of the image processing system 1 has been described above. Hereinafter, the detailed configuration of the image processing apparatus 10 in the image processing system 1 will be described. Herein, the detailed configurations of image processing apparatuses 10A to 10D will be described according to each embodiment.

2. Configuration of Image Processing Apparatus (1) First Embodiment: Basic Configuration (Configuration Example of Image Processing Apparatus)

Figure 2:
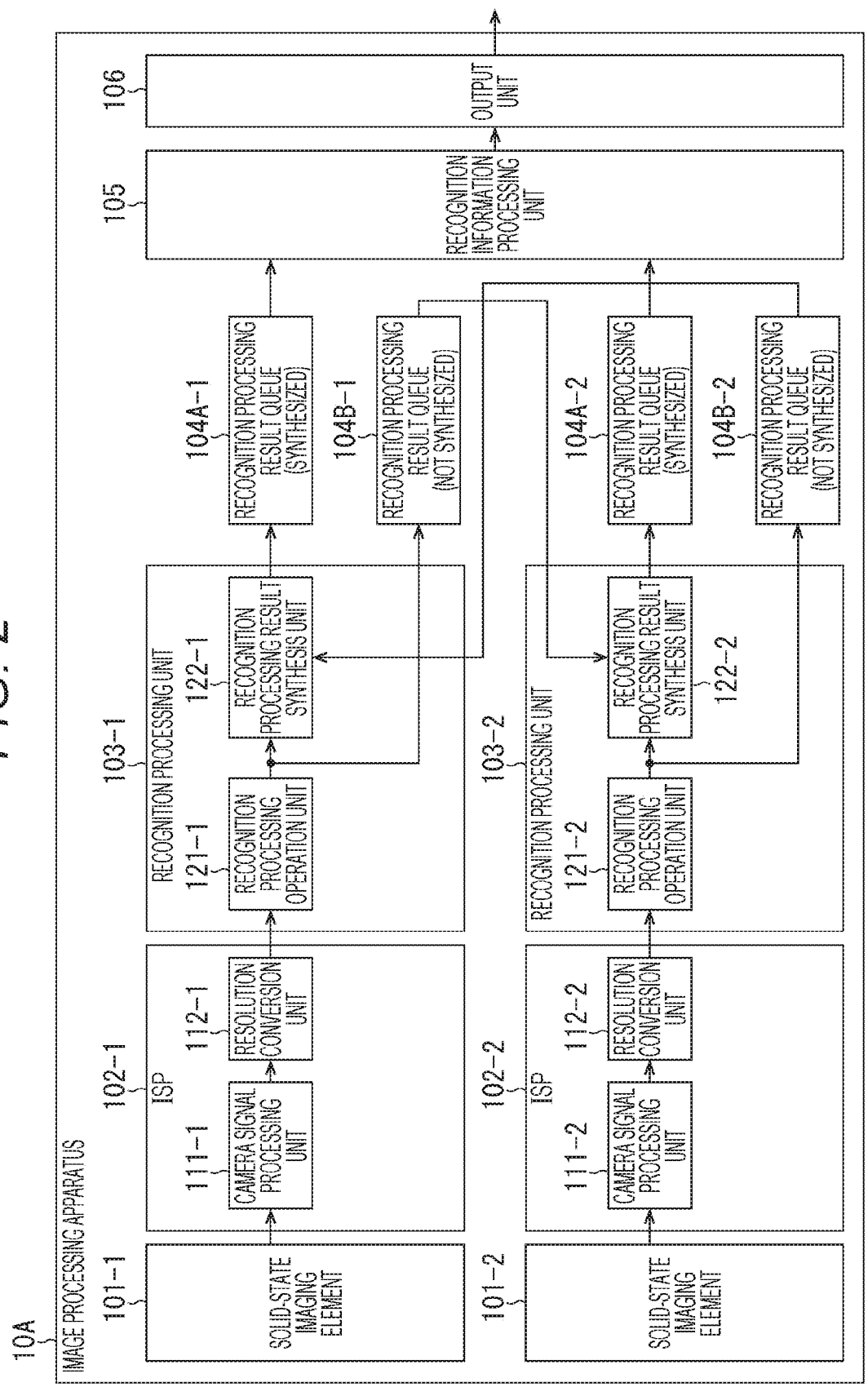
FIG. 2 is a diagram showing a configuration example of an image processing apparatus according to a first embodiment.

FIG. 2 is a diagram showing a configuration example of the image processing apparatus 10A according to the first embodiment.

In FIG. 2, the image processing apparatus 10A is configured with the first series, which includes a solid-state imaging element 101-1, an ISP 102-1, a recognition processing unit 103-1, a recognition processing result queue 104A-1 and a recognition processing result queue 104B-1, the second series, which includes a solid-state imaging element 101-2, an ISP 102-2, a recognition processing unit 103-2, a recognition processing result queue 104A-2 and a recognition processing result queue 104B-2, and a recognition information processing unit 105 and an output unit 106 for processing the outputs from the first series and the second series.

In the first series, the solid-state imaging element 101-1 photoelectrically converts light from a subject according to the light amount and supplies an image signal (RAW data) thereby obtained to the ISP 102-1.

Note that the solid-state imaging element 101-1 is an image sensor, such as a complementary metal oxide semiconductor (CMOS) image sensor or a charge coupled device (CCD) image sensor, and, for example, has an RGB pixel array such as a Bayer array. Moreover, the solid-state imaging element 101-1 works according to a clock inputted from the outside or a clock generated inside thereof so that the frame rate of the captured images (image frames) can be changed.

The ISP 102-1 is an image signal processor (ISP), performs predetermined signal processing on the image signal (RAW data) supplied from the solid-state imaging element 101-1, and supplies an image signal thereby obtained to the recognition processing unit 103-1. The ISP 102-1 is configured with a camera signal processing unit 111-1 and a resolution conversion unit 112-1.

The camera signal processing unit 111-1 subjects the image signal from the solid-state imaging element 101-1 to camera signal processing, thereby converting the image signal of the RGB format into an image signal of the YUV format. By converting the image signal into the image signal of the YUV format, the subsequent recognition processing can be performed. The image signal of the YUV format is supplied to the resolution conversion unit 112-1.

The resolution conversion unit 112-1 subjects the image signal supplied from the camera signal processing unit 111-1 to resolution conversion processing, thereby converting the resolution of the image signal of the YUV format. This resolution is, for example, resolution compatible with standard definition (SD), high definition (HD), ultra high definition (UHD) or the like. The image signal of the YUV format after the resolution thereof is converted is supplied to the recognition processing unit 103-1.

Note that, since the image signal outputted from the solid-state imaging element 101-1 is usually an image signal of (the resolution of) some fixed size, for example, the resolution conversion unit 112-1 performs resolution conversion processing for further decreasing the resolution of that fixed size as necessary.

The recognition processing unit 103-1 subjects the image signal supplied from the ISP 102-1 to predetermined image analysis processing and recognizes various kinds of information from the captured images, thereby performing processing for obtaining a recognition processing result (self-recognition processing result), and the like. The recognition processing unit 103-1 is configured with a recognition processing operation unit 121-1 and a recognition processing result synthesis unit 122-1.

The recognition processing operation unit 121-1 performs predetermined image analysis processing on the image signal supplied from the ISP 102-1 and supplies a recognition processing result (self-recognition processing result) thereby obtained to the recognition processing result synthesis unit 122-1. The recognition processing operation unit 121-1 also causes the recognition processing result queue 104B-1 to keep the recognition processing result (self-recognition processing result).

Note that, as this image analysis processing, for example, processing for recognizing the current object (object) included in the captured images (image frames) is performed. Herein, for example, various kinds of recognition processing can be performed by using known technologies for recognizing a face of a person, a physical body, and the like.

The recognition processing result synthesis unit 122-1 synthesizes the recognition processing result (self-recognition processing result) supplied from the recognition processing operation unit 121-1 and a recognition processing result (other recognition processing result) obtained by (a recognition processing operation unit 121-2 of) the recognition processing unit 103-2 in the second series descried later, and causes the recognition processing result queue 104A-1 to keep a recognition processing result (synthesized recognition processing result) thereby obtained. However, the recognition processing result (other recognition processing result) obtained by (the recognition processing operation unit 121-2 of) the recognition processing unit 103-2 in the second series is kept by the recognition processing result queue 104B-2.

That is, in the first series, the recognition processing result (synthesized recognition processing result) synthesized by the recognition processing result synthesis unit 122-1 is kept by the recognition processing result queue 104A-1, and the recognition processing result (self-recognition processing result) obtained by the recognition processing operation unit 121-1 is kept by the recognition processing result queue 104B-1. Note that the detailed configuration of the recognition processing result synthesis unit 122-1 will be described later with reference to FIG. 3.

Meanwhile, in the second series, similarly to the first series, an image signal obtained by imaging the subject with the solid-state imaging element 101-2 is inputted into the ISP 102-2, the image signal of the RGB format is converted into an image signal of the YUV format by a camera signal processing unit 111-2, and the resolution is converted by a resolution conversion unit 112-2.

Then, in the recognition processing unit 103-2, the recognition processing operation unit 121-2 performs predetermined image analysis processing on the image signal from the ISP 102-2, and a recognition processing result (self-recognition processing result) thereby obtained is kept by the recognition processing result queue 104B-2.

Moreover, a recognition processing result synthesis unit 122-2 synthesizes the recognition processing result (self-recognition processing result) obtained by the recognition processing operation unit 121-2 and the recognition processing result (other recognition processing result) obtained by (the recognition processing operation unit 121-1 of) the recognition processing unit 103-1 in the first series descried above, and a recognition processing result (synthesized recognition processing result) thereby obtained is kept by the recognition processing result queue 104A-2. However, the recognition processing result (other recognition processing result) obtained by (the recognition processing operation unit 121-1) of the recognition processing unit 103-1 in the first series is kept by the recognition processing result queue 104B-1.

That is, in the second series, the recognition processing result (synthesized recognition processing result) synthesized by the recognition processing result synthesis unit 122-2 is kept by the recognition processing result queue 104A-2, and the recognition processing result (self-recognition processing result) obtained by the recognition processing operation unit 121-2 is kept by the recognition processing result queue 104B-2.

Herein, in the image processing apparatus 10A, the recognition processing is performed on the captured images (image frames) with different output information regarding the imaging in the two series, the first series including the solid-state imaging element 101-1 and the like and the second series including the solid-state imaging element 101-2 and the like, and the recognition processing results are obtained.

For example, the output information regarding the imaging includes the frame rates of the captured images (image frames) and the resolutions of the captured images (image frames). That is, the captured images (image frames) processed in the first series and the second series have different frame rates and resolutions, and the recognition results of such captured images are obtained.

Specifically, for example, a low frame rate (e.g., one frame per second (fps) or the like) and high resolution (e.g., high definition (HD), ultra high definition (UHD), or the like) are set as the output information on the captured images (image frames) processed in the first series. Thus, for example, the detailed information on the current object (object) included in the captured images with the high resolution can be recognized, but it is difficult to recognize the motion of the current object (object) because of the low frame rate. Therefore, for example, in the first series, in a case where the object is a person, the detailed information such as the face and name of that person can be recognized, but the motion of that person cannot be recognized.

In addition, for example, a high frame rate (e.g., 60 fps or the like) and low resolution (e.g., standard definition (SD) or the like) are set as the output information on the captured images (image frames) processed in the second series. Thus, for example, it is difficult to recognize the detailed information on the current object (object) included in the captured images with the low resolution, but the motion of the current object (object) can be recognized because of the high frame rate. Therefore, for example, in the second series, in a case where the object is a person, the detailed motion of that person can be recognized (tracked), but the detailed information such as the face and name of that person cannot be recognized.

Note that the frame rates of the captured images (image frames) can be changed in each of the first series and the second series by changing the clocks for deciding the frame rates of the solid-state imaging element 101-1 and the solid-state imaging element 101-2. Moreover, the resolutions of the captured images (image frames) can be changed in each of the first series and the second series by changing the resolutions converted by the resolution conversion unit 112-1 and the resolution conversion unit 112-2.

Then, in the first series and the second series of the image processing apparatus 10A, the self-recognition processing results recognized in the self-series and the other recognition processing results recognized in the other series are synthesized so that more accurate recognition processing results (synthesized recognition processing results) can be obtained.

For example, in a case where processing are performed on the captured images (image frames) at a low frame rate and with high resolution in the first series, the detailed information on the current object (object) can be recognized as the self-recognition processing result, but it is difficult to recognize the motion of the current object (object) because of the low frame rate. In this case, by synthesizing the self-recognition processing result of the first series and the other recognition processing result of the second series, free periods at the frame intervals at the low frame rate in the self-recognition processing result of the first series are interpolated by using the other recognition processing result from the second series which performs processing on the captured images (image frames) at a high frame rate and with low resolution.

Thus, the self-recognition processing result cannot be obtained in the free periods at the frame intervals at the low frame rate (e.g., one fps or the like) in the first series, but the periods are interpolated by the other recognition processing result of the image frames at the high frame rate (e.g., 60 fps or the like) in the second series so that the accuracy of the recognition result can be improved, for example, the detailed motion of the current object (object) can be recognized (tracked).

Note that, although the details are not described herein, similarly in the second series, the captured images (image frames) with low resolution of the self-recognition processing result can be interpolated by using the other recognition processing result from the first series which performs processing on the captured images (image frames) at the low frame rate and with the high resolution.

Moreover, in the first series, the recognition processing result obtained by the recognition processing operation unit 121-1 of the recognition processing unit 103-1 is the self-recognition processing result, and the recognition processing result obtained by the recognition processing operation unit 121-2 of the recognition processing unit 103-2 is the other recognition processing result. On the other hand, in the second series, the recognition processing result obtained by the recognition processing operation unit 121-2 of the recognition processing unit 103-2 is the self-recognition processing result, and the recognition processing result obtained by the recognition processing operation unit 121-1 of the recognition processing unit 103-1 is the other recognition processing result. Furthermore, in terms of the first series, the self-series is the first series, and the other series is the second series. On the other hand, in terms of the second series, the self-series is the second series, and the other series is the first series.

Into the recognition information processing unit 105, the recognition processing result (synthesized recognition processing result) kept by the recognition processing result queue 104A-1 or the recognition processing result kept by the recognition processing result queue 104A-2 (synthesized recognition processing result) is inputted as recognition information. The recognition information processing unit 105 processes the recognition information from the recognition processing result queue 104A-1 or the recognition processing result queue 104A-2 and supplies the processing result to the output unit 106. For example, the recognition information processing unit 105 processes the recognition information and generates a picture in which the detailed explanation and the information regarding the motion are superimposed on the picture of the current object (object).

The output unit 106 outputs the processing result of the recognition information supplied from the recognition information processing unit 105, for example, to the output apparatus 20 (FIG. 1). Thus, on the output apparatus 20, for example, a picture corresponding to the recognition information, such as a picture in which the detailed explanation and the information regarding the motion are superimposed on the picture of the current object (object), is displayed.

Note that, the image processing apparatus 10A in FIG. 2 has been shown with the configuration which includes the solid-state imaging element 101-1 and the ISP 102-1 and the solid-state imaging element 101-2 and the ISP 102-2 as the imaging units, but a configuration, in which these imaging units are provided outside, may be adopted. Alternatively, only the solid-state imaging element 101-1 and the solid-state imaging element 101-2 may be provided outside.

Moreover, the image processing apparatus 10A in FIG. 2 has the configuration in which the recognition processing result queue 104A-1 and the recognition processing result queue 104B-1 are provided in the first series and the recognition processing result queue 104A-2 and the recognition processing result queue 104B-2 are provided in the second series so that the recognition processing results are kept, but the recognition processing results may be directly supplied to the recognition information processing unit 105 without providing these recognition processing result queues.

The image processing apparatus 10A is configured as described above.

(Detailed Configuration Example of Recognition Processing Result Synthesis Unit)

Figure 3:
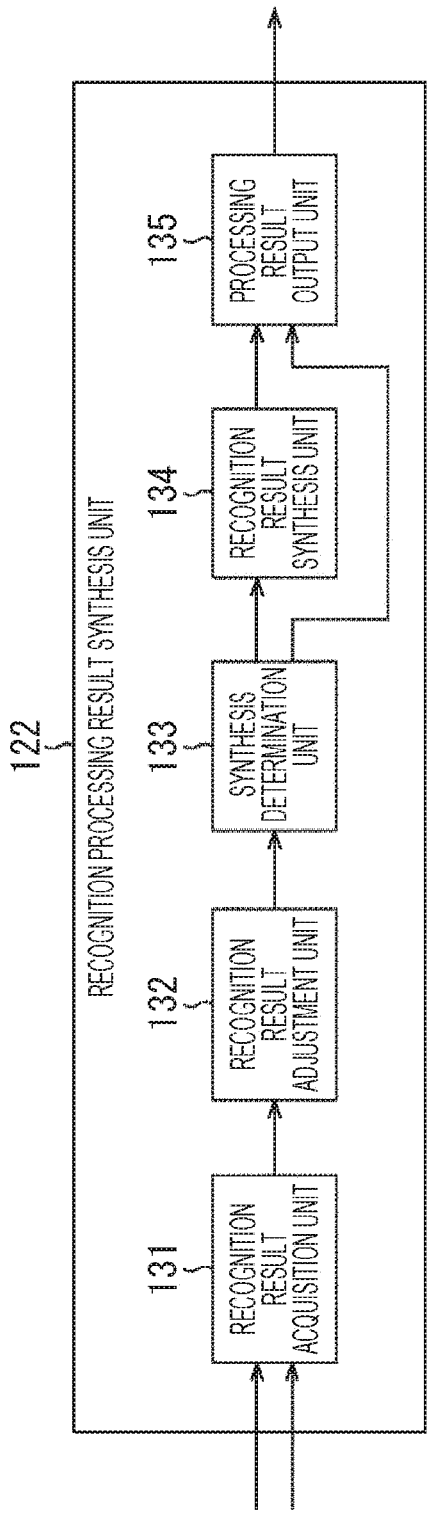
FIG. 3 is a diagram showing the detailed configuration of a recognition processing result synthesis unit.

FIG. 3 is a diagram showing a detailed configuration example of the recognition processing result synthesis unit 122-1 or the recognition processing result synthesis unit 122-2 in FIG. 2.

Note that, since the recognition processing result synthesis unit 122-1 in the first series and the recognition processing result synthesis unit 122-2 in the second series have similar configurations, the recognition processing result synthesis unit is denoted by a reference sign 122 in FIG. 3. Herein, the recognition processing result synthesis unit 122-1 in the first series will be described as a representative to make the explanation easy to understand.

The recognition processing result synthesis unit 122 (122-1, 122-2) is configured with a recognition result acquisition unit 131 (131-1, 131-2), a recognition result adjustment unit 132 (132-1, 132-2), a synthesis determination unit 133 (133-1, 133-2), a recognition result synthesis unit 134 (134-1, 134-2) and a processing result output unit 135 (135-1, 135-2).

The recognition result acquisition unit 131-1 acquires the self-recognition processing result supplied from the recognition processing operation unit 121-1 of the first series and the other recognition processing result which is the other recognition processing result operated by the recognition processing operation unit 121-2 of the second series and kept by the recognition processing result queue 104B-2, and supplies those to the recognition result adjustment unit 132-1.

The recognition result adjustment unit 132-1 is supplied with the self-recognition processing result of the first series and the other recognition processing result of the second series from the recognition result acquisition unit 131-1. The recognition result adjustment unit 132-1 adjusts at least one of the recognition processing results of the self-recognition processing result of the first series and the other recognition processing result of the second series to be in a synthesizable state, and supplies the recognition processing result after the adjustment to the synthesis determination unit 133-1.

The synthesis determination unit 133-1 is supplied with the recognition processing result (the self-recognition processing result of the first series and the other recognition processing result of the second series) after the adjustment from the recognition result adjustment unit 132-1. The synthesis determination unit 133-1 determines, on the basis of predetermined threshold information, whether to synthesize the self-recognition processing result of the first series and the other recognition processing result of the second series.

In a case where the self-recognition processing result of the first series and the other recognition processing result of the second series are determined to be synthesized, the synthesis determination unit 133-1 supplies the self-recognition processing result of the first series and the other recognition processing result of the second series, which are to be synthesized, to the recognition result synthesis unit 134-1. On the other hand, in a case where the self-recognition processing result of the first series and the other recognition processing result of the second series are determined not to be synthesized, the synthesis determination unit 133-1 supplies the self-recognition processing result of the first series to the processing result output unit 135-1.

In a case where the self-recognition processing result of the first series and the other recognition processing result of the second series are determined by the synthesis determination unit 133-1 to be synthesized, the self-recognition processing result of the first series and the other recognition processing result of the second series are inputted into the recognition result synthesis unit 134-1. In this case, the recognition result synthesis unit 134-1 synthesizes the self-recognition processing result of the first series and the other recognition processing result of the second series supplied from the synthesis determination unit 133-1 and supplies the result to the processing result output unit 135-1.

In a case where the self-recognition processing result of the first series and the other recognition processing result of the second series are determined by the synthesis determination unit 133-1 to be synthesized, the processing result output unit 135-1 is supplied with the recognition processing result (synthesized recognition processing result) obtained by synthesizing the self-recognition processing result and the other recognition processing result from the recognition result synthesis unit 134-1. The processing result output unit 135-1 causes the recognition processing result queue 104A-1 to keep the recognition processing result (synthesized recognition processing result) from the recognition result synthesis unit 134-1.

On the other hand, in a case where the self-recognition processing result of the first series and the other recognition processing result of the second series are determined by the synthesis determination unit 133-1 to be not synthesized, the processing result output unit 135-1 is supplied with the self-recognition processing result of the first series from the synthesis determination unit 133-1. The processing result output unit 135-1 causes the recognition processing result queue 104A-1 to keep the self-recognition processing result of the first series from the synthesis determination unit 133-1.

Note that the recognition processing result synthesis unit 122-1 in the first series has been described as a representative in FIG. 3, and the recognition processing result synthesis unit 122-2 in the second series is configured similarly.

(Flow of Recognition Processing)

Next, the flow of the recognition processing according to the first embodiment, which is executed by the image processing apparatus 10A in FIG. 2, will be described with reference to the flowchart in FIG. 4.

Figure 4:
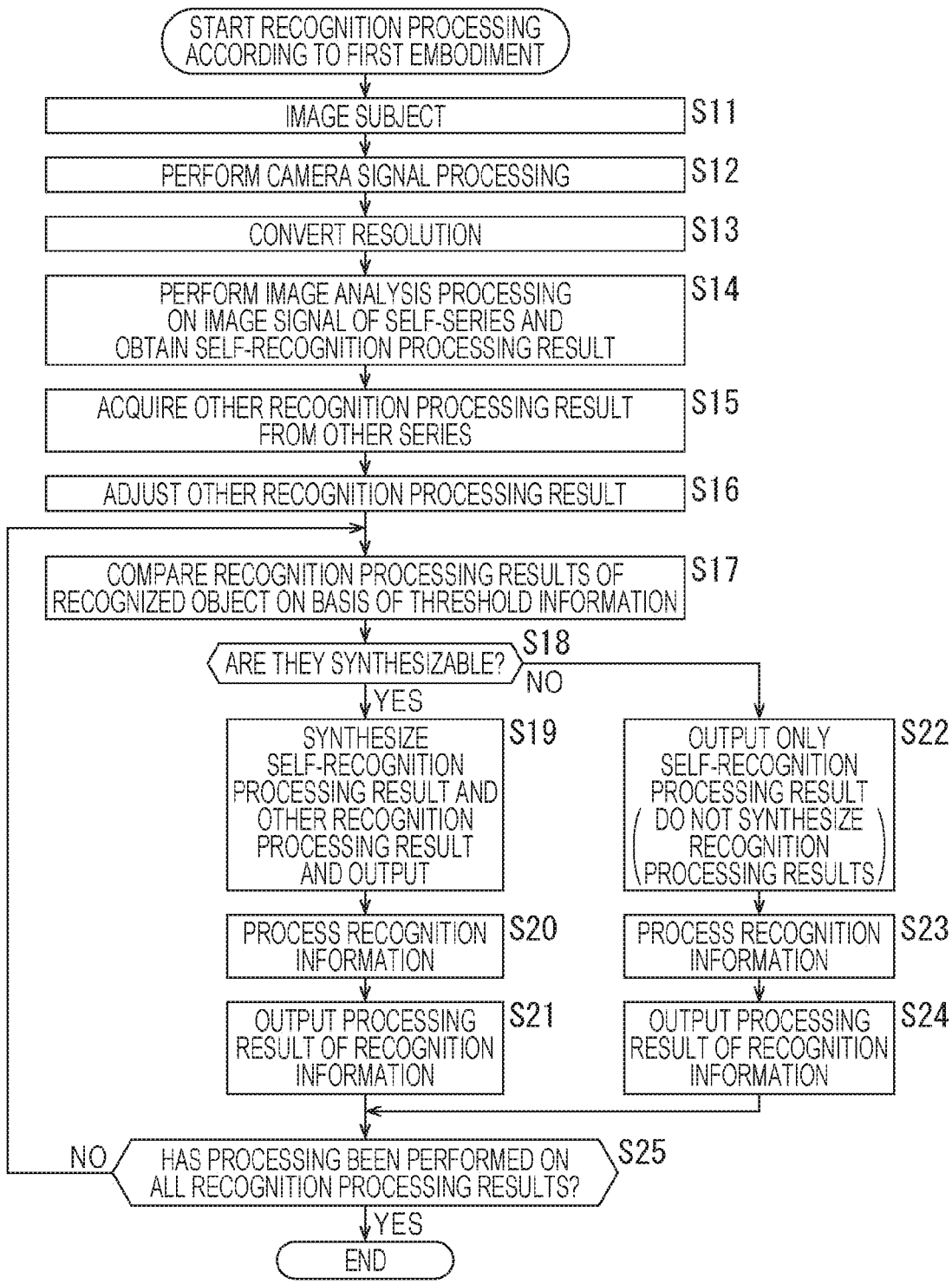
FIG. 4 is a flowchart for explaining a flow of recognition processing according to the first embodiment.

Note that, in the recognition processing in FIG. 4, the processing in the first series and the processing in the second series are performed simultaneously in parallel, but a case of the independent processing performed in the first series will be mainly described to make the explanation easy to understand. Moreover, "−1" is added to the processing (Step Sxx) performed in the first series and "−2" is added to the processing (Step Sxx) performed in the second series to distinguish the processing performed in each series. Furthermore, these relationships are also similar in other flow charts described later.

In Step S11-1, the solid-state imaging element 101-1 in the first series images the subject. In addition, in Step S11-2, the solid-state imaging element 102-2 in the second series images the subject simultaneously with the solid-state imaging element 101-1 in the first series.

However, in the first series, the solid-state imaging element 101-1 outputs the image signal according to the low frame rate (e.g., one fps or the like). On the other hand, in the second series, the solid-state imaging element 102-2 outputs the image signal according to a high frame rate (e.g., 60 fps or the like).

In Step S12-1, the camera signal processing unit 111-1 of the first series subjects the image signal from the solid-state imaging element 101-1 to the camera signal processing, thereby converting the image signal of the RGB format into the image signal of the YUV format. In addition, in Step S12-2, the camera signal processing unit 111-2 of the second series subjects the image signal from the solid-state imaging element 101-2 to the camera signal processing, thereby converting the image signal of the RGB format into the image signal of the YUV format.

In Step S13-1, the resolution conversion unit 112-1 of the first series subjects the image signal supplied from the camera signal processing unit 111-1 to the resolution conversion processing, thereby converting the resolution of the image signal of the YUV format. In addition, in Step S13-2, the resolution conversion unit 112-2 of the second series subjects the image signal supplied from the camera signal processing unit 111-2 to the resolution conversion processing, thereby converting the resolution of the image signal of the YUV format.

However, in the first series, the resolution conversion unit 112-1 converts the resolution of the image signal of the YUV format so as to be high resolution (e.g., high definition (HD), ultra high definition (UHD) or the like). On the other hand, in the second series, the resolution conversion unit 112-2 converts the resolution of the image signal of the YUV format so as to be low resolution (e.g., standard definition (SD) or the like). Note that the resolution conversion processing in each series is performed as necessary and is not necessarily executed.

That is, in the first series, the processing is performed on captured images (image frames) at a low frame rate and with high resolution. On the other hand, in the second series, the processing is performed on captured images (image frames) at a high frame rate and with low resolution.

In Step S14-1, the recognition processing operation unit 121-1 of the first series performs the predetermined image analysis processing on the image signal supplied from the resolution conversion unit 112-1 and obtains the self-recognition processing result. In addition, in Step S14-2, the recognition processing operation unit 121-2 of the second series performs the predetermined image analysis processing on the image signal supplied from the resolution conversion unit 112-2 and obtains the self-recognition processing result.

However, the recognition processing operation unit 121-1 of the first series causes the recognition processing result queue 104B-1 to keep the self-recognition processing result. In addition, the recognition processing operation unit 121-2 of the second series causes the recognition processing result queue 104B-2 to keep the self-recognition processing result. Thus, in the first series or the second series, the other recognition processing result, which is the other recognition processing result obtained in other series and kept in the recognition processing result queue 104B-2 or the recognition processing result queue 104B-1, can be acquired.

In Step S15-1, the recognition result acquisition unit 131-1 of the recognition processing result synthesis unit 122-1 of the first series acquires the other recognition processing result, which is the other recognition processing result operated by the recognition processing operation unit 121-2 of the second series and being kept by the recognition processing result queue 104B-2.

In Step S16-1, the recognition result adjustment unit 132-1 of the recognition processing result synthesis unit 122-1 of the first series adjusts the other recognition processing result acquired by the recognition result acquisition unit 131-1.

Herein, the self-recognition processing result and the other recognition processing result include, as the recognition processing results, for example, the sizes of the entire images of the captured images to be analyzed (image size information), information regarding the current object (object) recognized from the captured images to be analyzed (e.g., the sizes of the object, the coordinates indicating the positions of the object, the types and the categories of the object, the installation positions of the solid-state imaging elements, and the like), and time information regarding the captured images to be analyzed (e.g., time stamps).

Then, the self-recognition processing result and the other recognition processing result are obtained as the results of the recognition processing on the captured images (image frames) obtained in the series with different output information regarding the imaging (e.g., frame rates, resolutions, and the like). Thus, to handle these recognition processing results simultaneously (to make these be in a synthesizable state), for example, it is necessary to adapt the recognition processing result of the other (other recognition processing result) to the scale (coordinate system) of the recognition processing result of the one (self-recognition processing result) by using the image size information.

That is, in the recognition result adjustment unit 132-1, to adapt the recognition processing result of the other (other recognition processing result) to the scale (coordinate system) of the recognition processing result of the one (self-recognition processing result), the other recognition processing result is adjusted by using parameters such as the image size information. However, the target of the adjustment herein is not limited to the other recognition processing result, and, for example, to adapt to the scale (coordinate system) of the other recognition processing result, the self-recognition processing result may be adjusted, or both the self-recognition processing result and the other recognition processing result may be adjusted.

Note that, since the distance between the solid-state imaging element 101-1 and the solid-state imaging element 101-2 can be obtained by acquiring information on places where the solid-state imaging element 101-1 and the solid-state imaging element 101-2 are attached (positional information), more accurate coordinates can be calculated. Herein, for example, the coordinate system of the recognition processing results can be obtained by using various methods such as a method using the principle of triangulation in consideration of the information on the places where the solid-state imaging element 101-1 and the solid-state imaging element 101-2 are attached.

In Step S17-1, on the basis of the predetermined threshold information, the synthesis determination unit 133-1 compares the recognition processing results (the self-recognition processing result and the other recognition processing result) of the current object (object) recognized from the captured images (image frames) with different image sizes (resolutions).

Herein, for example, as the threshold information, information for determining whether or not to synthesize the recognition processing results (the self-recognition processing result and the other recognition processing result) obtained from the captured images with different image sizes (resolutions) is preset. Herein, for example, information indicating the degree of the range of coordinates to be allowed to deviate when the coordinates indicating the positions of the object recognized from the captured images with different image sizes (resolutions) are matched, and information indicating the degree of the difference between kinds and categories (types) of the object to be allowed can be set as the threshold information.

Specifically, for example, in a case where the object is a vehicle and recognized as the self-recognition processing result of the first series, when the object is a conveyance and recognized as the other recognition processing result of the second series, information for determining whether or not these objects are the same and whether the self-recognition processing result of the first series and the other recognition processing result of the second series should be synthesized is preset as the threshold information. Note that tag information may be added to a person or a physical body to prevent different objects from being recognized as the same object.

In Step S18-1, on the basis of the comparison processing result in Step S17-1, the synthesis determination unit 133-1 determines whether or not the self-recognition processing result of the first series and the other recognition processing result of the second series are synthesizable.

In Step S18-1, in a case where the self-recognition processing result and the other recognition processing result are determined to be synthesizable, the processing proceeds to Step S19-1. In Step S19-1, the recognition result synthesis unit 134-1 synthesizes the self-recognition processing result of the first series and the other recognition processing result of the second series. In addition, in Step S19-1, the processing result output unit 135-1 causes the recognition processing result queue 104A-1 to keep the recognition processing result (synthesized recognition processing result) obtained by synthesizing the self-recognition processing result and the other recognition processing result.

In Step S20 (S20-1), the recognition information processing unit 105 retrieves the recognition processing result (synthesized recognition processing result) kept by the recognition processing result queue 104A-1 as the recognition information to process. For example, the recognition information processing unit 105 processes the recognition information and generates a picture in which the detailed explanation and the information regarding the motion are superimposed on the picture of the object included in the image frames.

Figure 5:
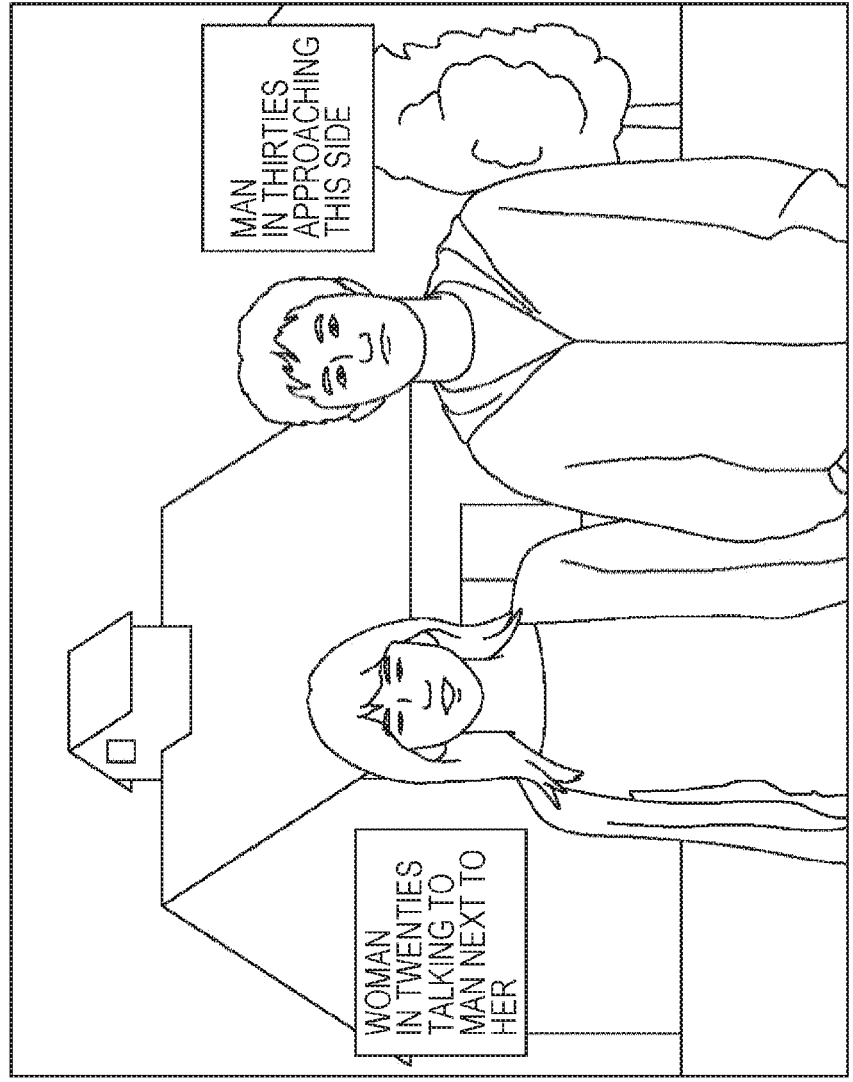
FIG. 5 is a diagram showing a display example of recognition information.

In Step S21 (S21-1), the output unit 106 outputs the processing result of the recognition information obtained by the processing in Step S20 (S20-1), for example, to the output apparatus 20 (FIG. 1). Thus, for example, a picture as shown in FIG. 5 is displayed on the screen of the output apparatus 20.

That is, in this example, in a case where a man and a woman are recognized as objects from image frames with different image sizes (resolutions) and determined to be synthesizable, the detailed information on the objects (man: "man in thirties", woman: "woman in twenties"), and the information regarding the motions of the objects (man: "approaching this side", woman: "talking to a man next to her") are on screen display (OSD) for the objects (man and woman) included in the image frames.

Note that, herein, the detailed information on the objects is information displayed according to the self-recognition processing result obtained from the captured images (image frames) of the first series at a low frame rate and with high resolution. In addition, the information regarding the motions of the objects is information displayed according to the other recognition processing result obtained from the captured images (image frames) of the second series at a high frame rate and with low resolution.

Returning to the explanation for FIG. 4, on the other hand, in a case where the self-recognition processing result and the other recognition processing result are determined to be not synthesizable in Step S18-1, the processing proceeds to Step S22 (S22-1). In this case, the synthesis processing on the self-recognition processing result and the other recognition processing result is not performed by the recognition result synthesis unit 134-1, and the self-recognition processing result is supplied to the processing result output unit 135-1.

In Step S22 (S22-1), the processing result output unit 135-1 causes the recognition processing result queue 104A-1 to keep the recognition processing result (self-recognition processing result).

In Step S23 (S23-1), the recognition information processing unit 105 retrieves the recognition processing result (self-recognition processing result) kept by the recognition processing result queue 104A-1 as the recognition information to process. For example, the recognition information processing unit 105 processes the recognition information and generates a picture in which only the information regarding the detailed explanation is superimposed on the picture of the object included in the image frames.

In Step S24 (S24-1), the output unit 106 outputs the processing result of the recognition information obtained by the processing in Step S23 (S23-1), for example, to the output apparatus 20 (FIG. 1). Thus, for example, in FIG. 5, only the detailed information on the objects (man: "man in thirties", woman: "woman in twenties") is on screen display for the objects (man and woman) included in the image frames. Note that, herein, the detailed information on the objects is information displayed according to the self-recognition processing result obtained from the captured images (image frames) of the first series at a low frame rate and with high resolution.

When the processing in Step S21 (S21-1) or Step S24 (S24-1) ends, the processing proceeds to Step S25 (S25-1). In Step S25 (S25-1), whether or not the processing has been performed on all the recognition processing results is determined. In a case that the processing has not been performed on all the recognition processing results is determined in Step S25 (S25-1), the processing returns to Step S17 (S17-1), and the subsequent processing are repeated.

Herein, for example, whether or not the processing has been performed on all objects in a case where the plurality of objects are recognized from the image frames, whether or not all the other recognition processing results obtained by the recognition processing (recognition processing on the image frames at the high frame rate) of the second series are applied to the self-recognition processing result obtained by the recognition processing (recognition processing on the image frames at the low frame rate) of the first series, and the like are determined.

Then, in a case where that the processing has been performed on all the recognition processing results is determined in Step S25 (S25-1), the recognition processing according to the first embodiment in FIG. 4 is ended.

Note that the case of the independent processing performed in the first series has been described in the above description. In a case of the independent second series, the similar processing is performed in which the recognition processing result of the second series is the self-recognition processing result, and the recognition processing result of the first series is the other recognition processing result.

The flow of the recognition processing according to the first embodiment has been described above. In this recognition processing according to the first embodiment, not only the self-recognition processing result recognized in the self-series but also the other recognition processing result recognized in other series are synthesized in each series. Thus, the accuracy of the recognition results of the current object (object) included in the captured images (image frames) can be improved.

For example, even if the self-series performs the recognition processing on the captured images (image frames) at a low frame rate, the recognition processing result for the free periods at the intervals of those image frames can be interpolated by the recognition processing result of the captured images (image frames) at a high frame rate by the other series. Thus, the accuracy of the recognition result can be improved.

Moreover, for example, Patent Document 1 previously mentioned discloses a technology for performing imaging control adapted to the captured scenes by linking detection results obtained by performing signal processing on the captured images captured by a plurality of cameras. However, the technology disclosed herein changes contents of the control, such as increasing the frame rate of the imaging images and the like, by using the detection results and is different from the one in which not only the self-recognition processing result recognized in the self-series but also the other recognition processing result recognized in other series are synthesized in each series in the recognition processing according to the first embodiment.

Furthermore, for example, Patent Document 2 previously mentioned discloses a technology for performing image quality adjustment for increasing the recognition rate by feeding back the recognition result of a subject included in the captured images captured by a camera. However, the technology disclosed herein is for improving the image recognition rate and different from the one in which not only the self-recognition processing result recognized in the self-series but also the other recognition processing result recognized in other series are synthesized in each series in the recognition processing according to the first embodiment.

Further, as one of the general methods used to drop the amount of analysis processing, by using a so-called image pyramid (a group of images with different resolutions), an image with optimal resolution is used for the analysis processing or the analysis is started on an image with low resolution and then the resolution is gradually increased to improve the accuracy of the analysis.

However, this method needs captured images at a high frame rate as an input from a camera (sensor). Thus, the influence on power saving is lowered. On the other hand, in the image processing apparatus 10A, the total number of pixels of the captured images outputted from the solid-state imaging element 101-1 (or the solid-state imaging element 101-2) per unit time can be decreased as compared with this method. As a result, power consumption can be decreased. In addition, when pyramid scaling (scaling for creating an image pyramid) is performed, a band for reducing the captured images is necessary. However, in the recognition processing according to the first embodiment, the current captured images for the recognition processing have already been reduced. Thus, such a band can be decreased.

(2) Second Embodiment: Configuration for Performing Recognition Processing Using Recognition Processing Result of Other Series (Configuration Example of Image Processing Apparatus)

Figure 6:
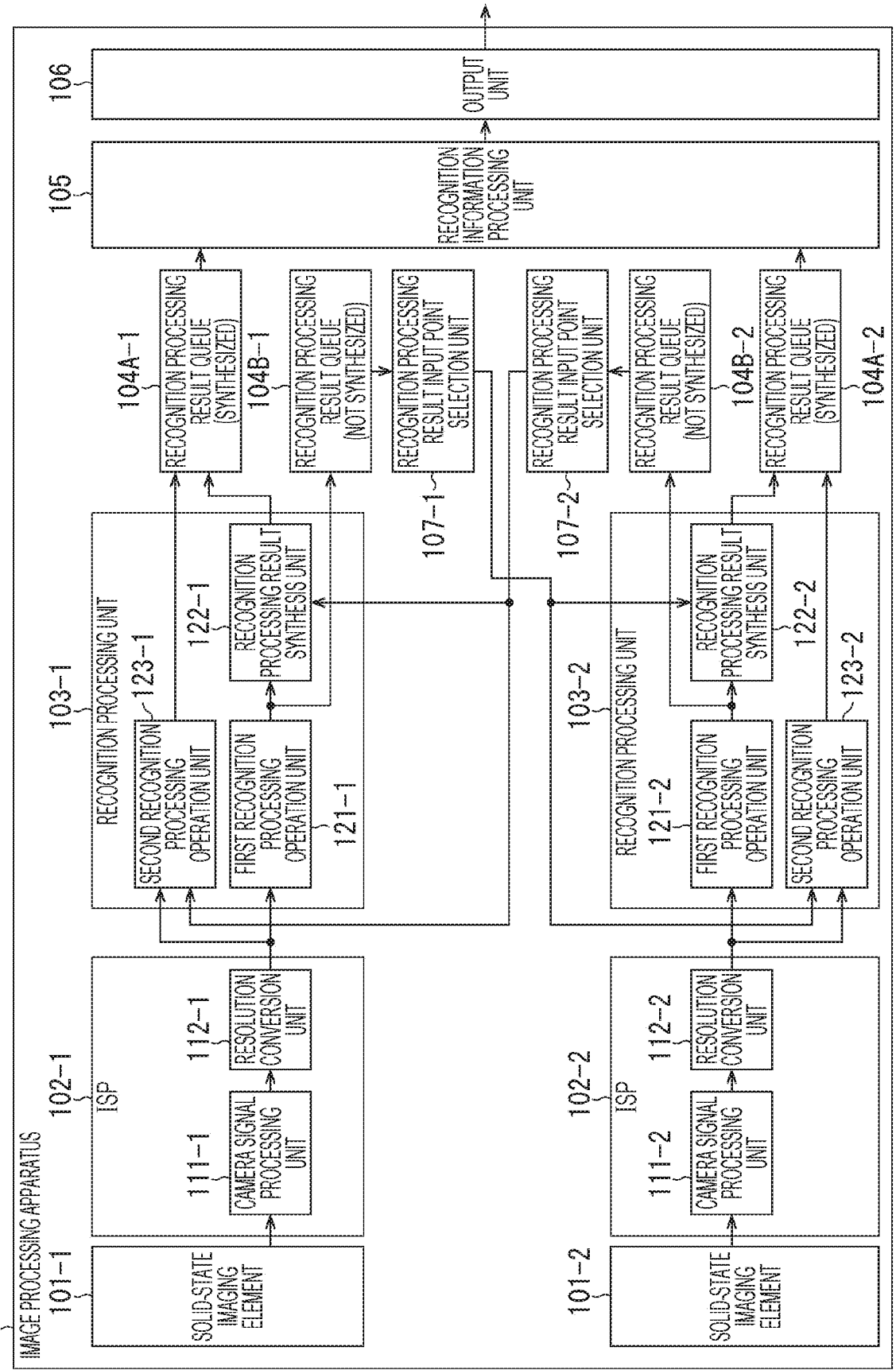
FIG. 6 is a diagram showing a configuration example of an image processing apparatus according to a second embodiment.

FIG. 6 is a diagram showing a configuration example of the image processing apparatus 10B according to the second embodiment.

In FIG. 6, the image processing apparatus 10B is configured with the first series, which includes a solid-state imaging element 101-1, an ISP 102-1, a recognition processing unit 103-1, a recognition processing result queue 104A-1, a recognition processing result queue 104B-1 and a recognition processing result input point selection unit 107-1, the second series, which includes a solid-state imaging element 101-2, an ISP 102-2, a recognition processing unit 103-2, a recognition processing result queue 104A-2, a recognition processing result queue 104B-2 and a recognition processing result input point selection unit 107-2, and a recognition information processing unit 105 and an output unit 106 for processing the outputs from the first series and the second series.

Note that, in the image processing apparatus 10B in FIG. 6, parts corresponding to those of the image processing apparatus 10A in FIG. 2 are denoted by the same reference signs, and the descriptions thereof will be omitted as appropriate to avoid the redundancy.

That is, the image processing apparatus 10B in FIG. 6 is different from the image processing apparatus 10A in FIG. 2 in that the recognition processing result input point selection unit 107-1 is additionally provided in the first series, and further, a second recognition processing operation unit 123-1 is added to the recognition processing unit 103-1 in addition to a first recognition processing operation unit 121-1. However, the first recognition processing operation unit 121-1 corresponds to the recognition processing operation unit 121-1 in FIG. 2 previously mentioned, and "first" is added to the name thereof to distinguish the first recognition processing operation unit 121-1 from the second recognition processing operation unit 123-1.

Similarly, the image processing apparatus 10B in FIG. 6 is different from the image processing apparatus 10A in FIG. 2 in that the recognition processing result input point selection unit 107-2 is additionally provided in the second series, and further, a second recognition processing operation unit 123-2 is added to the recognition processing unit 103-2 in addition to a first recognition processing operation unit 121-2. However, the first recognition processing operation unit 121-2 corresponds to the recognition processing operation unit 121-2 in FIG. 2 previously mentioned.

Note that, also in the second embodiment, similarly to the first embodiment previously mentioned, for example, processing can be performed on captured images (image frames) at a low frame rate (e.g., one fps or the like) and with high resolution (e.g., high definition (HD) or the like) in the first series while processing can be performed on captured images (image frames) at a high frame rate (e.g., 60 fps or the like) and with low resolution (e.g., standard definition (SD) or the like) in the second series.

In the first series, the recognition processing unit 103-1 is configured with the first recognition processing operation unit 121-1, a recognition processing result synthesis unit 122-1 and the second recognition processing operation unit 123-1.

The first recognition processing operation unit 121-1 performs predetermined image analysis processing on an image signal supplied from the ISP 102-1 and supplies a recognition processing result (self-recognition processing result) thereby obtained to the recognition processing result synthesis unit 122-1. The first recognition processing operation unit 121-1 also causes the recognition processing result queue 104B-1 to keep the recognition processing result (self-recognition processing result).

Herein, a recognition processing result (other recognition processing result) from the recognition processing result input point selection unit 107-2 of the second series is inputted into the recognition processing unit 103-1 of the first series, and this recognition processing result (other recognition processing result) is selectively inputted into the recognition processing result synthesis unit 122-1 or the second recognition processing operation unit 123-1.

In a case where the recognition processing result (other recognition processing result) from the recognition processing result input point selection unit 107-2 of the second series is inputted into the recognition processing result synthesis unit 122-1 in the recognition processing unit 103-1 of the first series, the recognition processing result synthesis unit 122-1 synthesizes the recognition processing result (self-recognition processing result) supplied from the first recognition processing operation unit 121-1 and the recognition processing result (other recognition processing result) from the recognition processing result input point selection unit 107-2 and causes the recognition processing result queue 104A-1 to keep a recognition processing result (synthesized recognition processing result) thereby obtained.

Moreover, in a case where the recognition processing result (other recognition processing result) from the recognition processing result input point selection unit 107-2 of the second series is inputted into the second recognition processing operation unit 123-1 in the recognition processing unit 103-1 of the first series, the second recognition processing operation unit 123-1 performs, on the basis of the recognition processing result (other recognition processing result) from the recognition processing result input point selection unit 107-2, predetermined image analysis processing on the image signal supplied from the ISP 102-1. Then, the second recognition processing operation unit 123-1 causes the recognition processing result queue 104A-1 to keep the recognition processing result (synthesized recognition processing result) obtained as a result of the predetermined image analysis processing.

That is, in the first series, the recognition processing result (synthesized recognition processing result) synthesized by the recognition processing result synthesis unit 122-1 or the recognition processing result (synthesized recognition processing result) obtained by the second recognition processing operation unit 123-1 is kept by the recognition processing result queue 104A-1, and the recognition processing result (self-recognition processing result) obtained by the first recognition processing operation unit 121-1 is kept by the recognition processing result queue 104B-1.

Moreover, the recognition processing result input point selection unit 107-1 of the first series selectively supplies the recognition processing result (self-recognition processing result) being kept by the recognition processing result queue 104B-1 to a recognition processing result synthesis unit 122-2 or the second recognition processing operation unit 123-2 in the recognition processing unit 103-2 of the second series.

Meanwhile, in the second series, similarly to the first series, the first recognition processing operation unit 121-2 in the recognition processing unit 103-2 performs predetermined image analysis processing on an image signal from the ISP 102-2, and a recognition processing result (self-recognition processing result) thereby obtained is kept by the recognition processing result queue 104B-2.

Herein, the recognition processing result (other recognition processing result) from the recognition processing result input point selection unit 107-1 of the first series is inputted into the recognition processing unit 103-2 of the second series, and this recognition processing result (other recognition processing result) is selectively inputted into the recognition processing result synthesis unit 122-2 or the second recognition processing operation unit 123-2.

In a case where the recognition processing result (other recognition processing result) from the recognition processing result input point selection unit 107-1 of the first series is inputted into the recognition processing result synthesis unit 122-2 in the recognition processing unit 103-2 of the second series, the recognition processing result synthesis unit 122-2 synthesizes the recognition processing result (self-recognition processing result) supplied from the first recognition processing operation unit 121-2 and the recognition processing result (other recognition processing result) from the recognition processing result input point selection unit 107-1 and causes the recognition processing result queue 104A-2 to keep a recognition processing result (synthesized recognition processing result) thereby obtained.

Moreover, in a case where the recognition processing result (other recognition processing result) from the recognition processing result input point selection unit 107-1 of the first series is inputted into the second recognition processing operation unit 123-2 in the recognition processing unit 103-2 of the second series, the second recognition processing operation unit 123-2 performs, on the basis of the recognition processing result (other recognition processing result) from the recognition processing result input point selection unit 107-1, predetermined image analysis processing on the image signal supplied from the ISP 102-2. Then, the second recognition processing operation unit 123-2 causes the recognition processing result queue 104A-2 to keep the recognition processing result (synthesized recognition processing result) obtained as a result of the predetermined image analysis processing.

That is, in the second series, the recognition processing result (synthesized recognition processing result) synthesized by the recognition processing result synthesis unit 122-2 or the recognition processing result (synthesized recognition processing result) obtained by the second recognition processing operation unit 123-2 is kept by the recognition processing result queue 104A-2, and the recognition processing result (self-recognition processing result) obtained by the first recognition processing operation unit 121-2 is kept by the recognition processing result queue 104B-2.

Moreover, the recognition processing result input point selection unit 107-2 of the second series selectively supplies the recognition processing result (self-recognition processing result) being kept by the recognition processing result queue 104B-2 to the recognition processing result synthesis unit 122-1 or the second recognition processing operation unit 123-1 in the recognition processing unit 103-1 of the first series.

Note that the configuration of the image processing apparatus 10B in FIG. 6 other than those described above is similar to the configuration of the image processing apparatus 10A in FIG. 2.

The image processing apparatus 10B is configured as described above.

(Flow of Recognition Processing)

Next, the flow of the recognition processing according to the second embodiment, which is executed by the image processing apparatus 10B in FIG. 6, will be described with reference to the flowchart in FIG. 7.

In Steps S51-1 to S53-1, similarly to Steps S11-1 to S13-1 in FIG. 4, the captured images captured by the solid-state imaging element 101-1 of the first series are subjected to camera signal processing and resolution conversion processing. In addition, in Steps S51-2 to S53-2, similarly to Steps S11-2 to S13-2 in FIG. 4, the captured images captured by the solid-state imaging element 101-2 of the second series are subjected to camera signal processing and resolution conversion processing.

In Step S54-1, the recognition processing result input point selection unit 107-2 of the second series selects, as an input point of the recognition processing result (other recognition processing result from the viewpoint of the first series) being kept by the recognition processing result queue 104B-2, one of the recognition processing result synthesis unit 122-1 or the second recognition processing operation unit 123-1 in the recognition processing unit 103-1 of the first series.

In Step S55-1, determined is whether or not one of the recognition processing result synthesis unit 122-1 or the second recognition processing operation unit 123-1 has been selected as the input point of the other recognition processing result in the selection processing in Step S54-1.

In a case where the input point of the other recognition processing result is determined to be the recognition processing result synthesis unit 122-1 in Step S55-1, the processing proceeds to Step S56-1.

In Steps S56-1 to 67-1, similarly to Steps S14-1 to S25-1 in FIG. 4, in a case where the self-recognition processing result and the other recognition processing result are determined to be synthesizable, the self-recognition processing result from the first recognition processing operation unit 121-1 of the first series and the other recognition processing result from the recognition processing result input point selection unit 107-2 of the second series are synthesized and outputted by the recognition processing result synthesis unit 122-1.

In addition, in Steps S56-1 to 67-1, similarly to Steps S14-1 to S25-1 in FIG. 4, in a case where the self-recognition processing result and the other recognition processing result are not synthesizable, the recognition processing result synthesis unit 122-1 does not perform the synthesis processing on the self-recognition processing result and the other recognition processing result, and the self-recognition processing result from the first recognition processing operation unit 121-1 of the first series is outputted.

On the other hand, in a case where the input point of the other recognition processing result is determined to be the second recognition processing operation unit 123-1 in Step S55-1, the processing proceeds to Step S68-1.

In Step S68-1, the second recognition processing operation unit 123-1 of the recognition processing unit 103-1 of the first series acquires the other recognition processing result which is the other recognition processing result operated by the first recognition processing operation unit 121-2 of the second series, supplied from the recognition processing result input point selection unit 107-2 and being kept by the recognition processing result queue 104B-2.

In Step S69-1, the second recognition processing operation unit 123-1 of the recognition processing unit 103-1 of the first series performs, on the basis of the recognition processing result (other recognition processing result) from the recognition processing result input point selection unit 107-2, the predetermined image analysis processing on the image signal supplied from the ISP 102-1 and obtains the recognition processing result (synthesized recognition processing result). Then, the second recognition processing operation unit 123-1 causes the recognition processing result queue 104A-1 to keep the recognition processing result (synthesized recognition processing result).

In Step S70 (S70-1), the recognition information processing unit 105 retrieves the recognition processing result (synthesized recognition processing result) kept by the recognition processing result queue 104A-1 as the recognition information to process. For example, the recognition information processing unit 105 processes the recognition information and generates a picture in which the detailed explanation and the information regarding the motion are superimposed on the picture of the object included in the image frames.

In Step S71 (S71-1), the output unit 106 outputs the processing result of the recognition information obtained by the processing in Step S70 (S70-1), for example, to the output apparatus 20 (FIG. 1).

Figure 7:
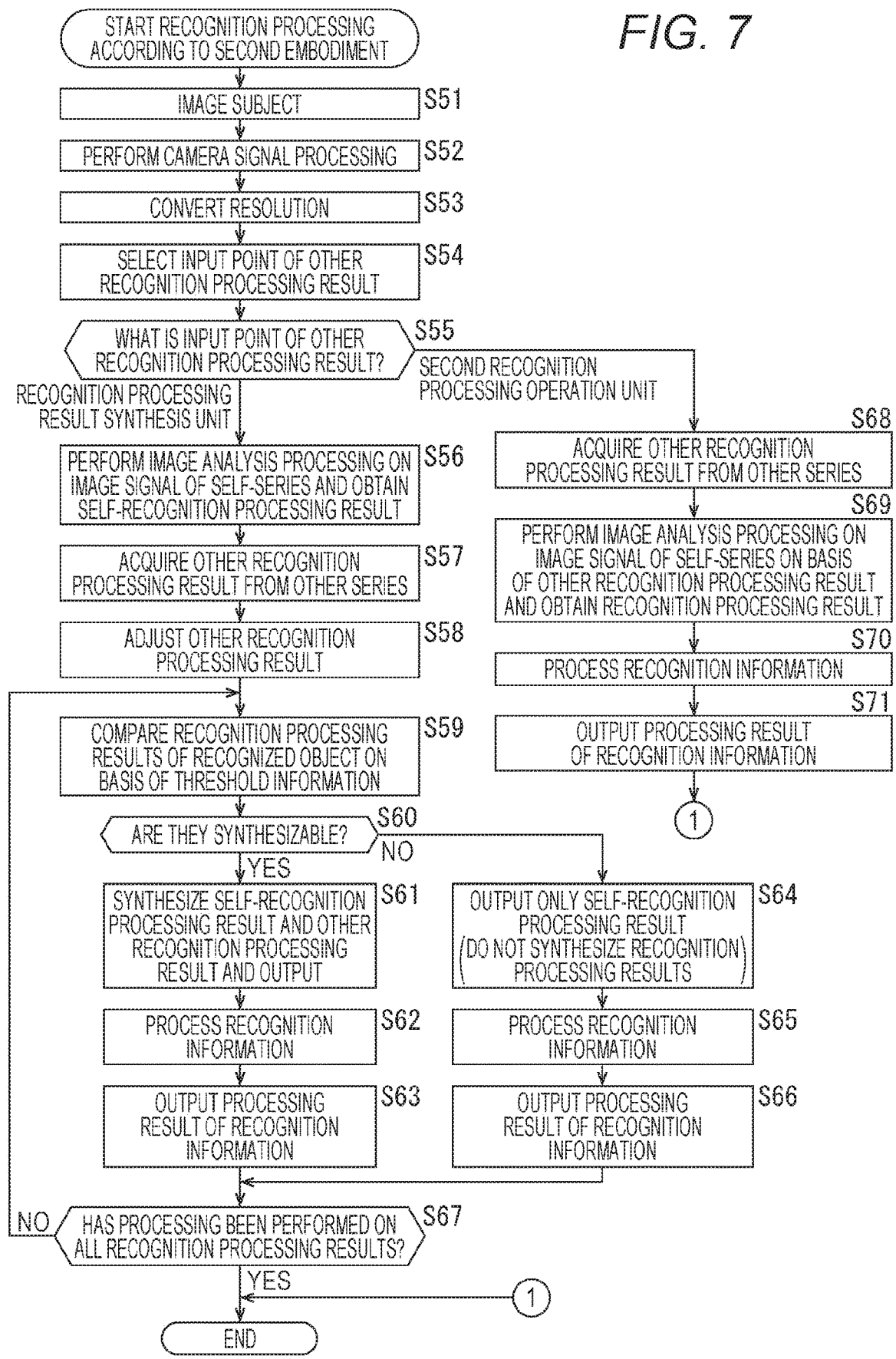
FIG. 7 is a flowchart for explaining a flow of recognition processing according to the second embodiment.

When the processing in Step S67 or Step S71 ends, the recognition processing according to the second embodiment in FIG. 7 is ended.

Note that the case of the independent processing performed in the first series has been described in the above description. In a case of the independent second series, the similar processing is performed in which the recognition processing result of the second series is the self-recognition processing result, and the recognition processing result of the first series is the other recognition processing result.

The flow of the recognition processing according to the second embodiment has been described above. In this recognition processing according to the second embodiment, the self-recognition processing result recognized in the self-series can be obtained on the basis of the other recognition processing result recognized in other series in each series. Thus, the accuracy of the recognition results of the current object (object) included in the captured images (image frames) can be improved. Moreover, compared with the first embodiment, it can be said that the other recognition processing result of the other series is used at the stage of the recognition processing before the synthesis of the recognition processing results in the second embodiment.

(3) Third Embodiment: Configuration for Performing Synthesis Processing According to Timing of the Recognition Processing Result (Configuration Example of Image Processing Apparatus)

Figure 8:
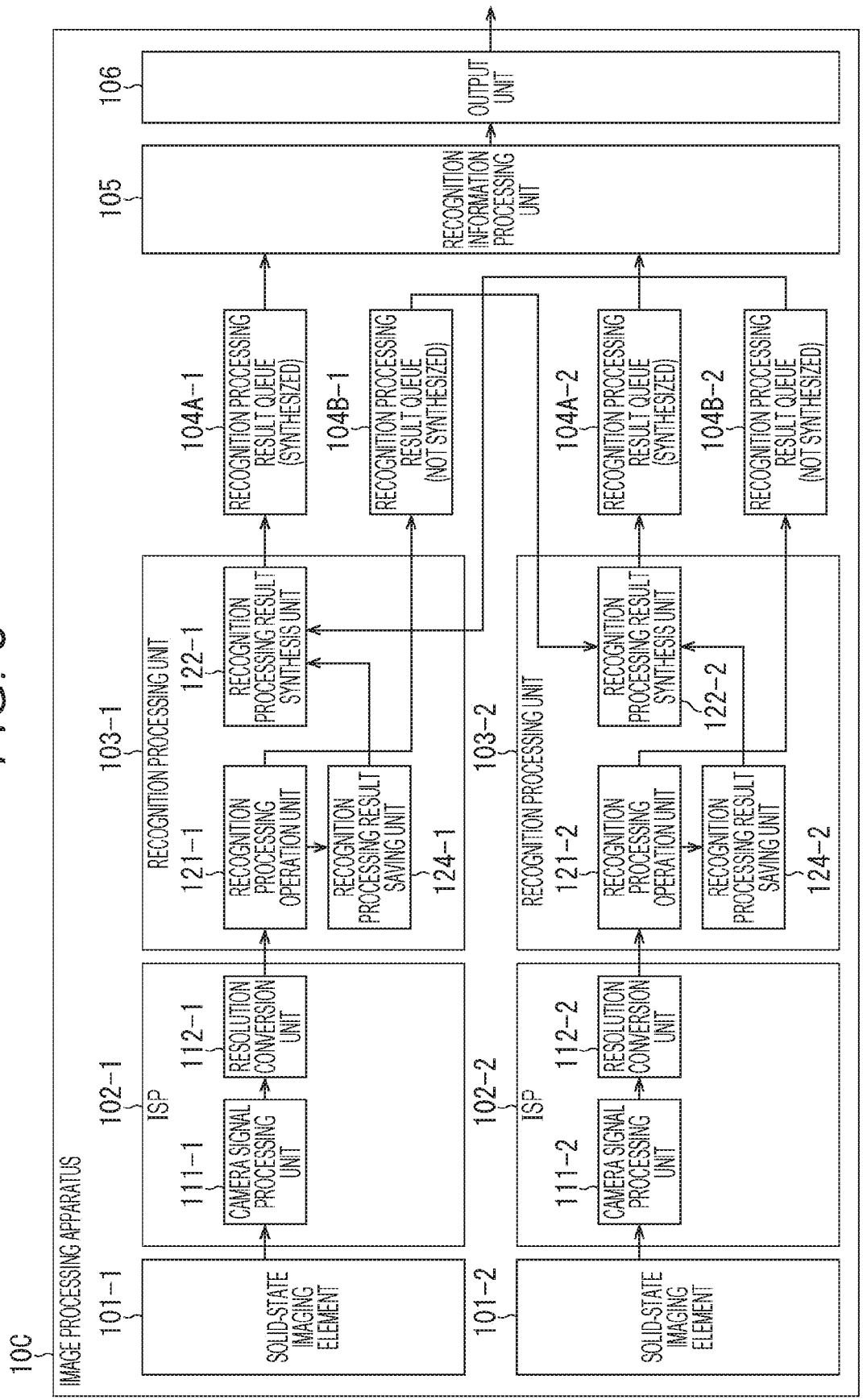
FIG. 8 is a diagram showing a configuration example of an image processing apparatus according to a third embodiment.

FIG. 8 is a diagram showing a configuration example of the image processing apparatus 10C according to the third embodiment.

In FIG. 8, the image processing apparatus 10C is configured with the first series, which includes a solid-state imaging element 101-1, an ISP 102-1, a recognition processing unit 103-1, a recognition processing result queue 104A-1 and a recognition processing result queue 104B-1, the second series, which includes a solid-state imaging element 101-2, an ISP 102-2, a recognition processing unit 103-2, a recognition processing result queue 104A-2 and a recognition processing result queue 104B-2, and a recognition information processing unit 105 and an output unit 106 for processing the outputs from the first series and the second series.

Note that, in the image processing apparatus 10C in FIG. 8, parts corresponding to those of the image processing apparatus 10A in FIG. 2 are denoted by the same reference signs, and the descriptions thereof will be omitted as appropriate to avoid the redundancy.

That is, the image processing apparatus 10C in FIG. 8 is different from the image processing apparatus 10A in FIG. 2 in that a recognition processing result saving unit 124-1 is additionally provided in the recognition processing unit 103-1 of the first series in addition to a recognition processing operation unit 121-1 and a recognition processing result synthesis unit 122-1.

Moreover, the image processing apparatus 10C in FIG. 8 is different from the image processing apparatus 10A in FIG. 2 in that a recognition processing result saving unit 124-2 is additionally provided in the recognition processing unit 103-2 of the second series in addition to a recognition processing operation unit 121-2 and a recognition processing result synthesis unit 122-2.

Note that, also in the third embodiment, similarly to the first embodiment previously mentioned, for example, processing can be performed on captured images (image frames) at a low frame rate (e.g., one fps or the like) and with high resolution (e.g., high definition (HD) or the like) in the first series while processing can be performed on captured images (image frames) at a high frame rate (e.g., 60 fps or the like) and with low resolution (e.g., standard definition (SD) or the like) in the second series.

In the first series, the recognition processing unit 103-1 is configured with the recognition processing operation unit 121-1, the recognition processing result synthesis unit 122-1 and the recognition processing result saving unit 124-1.

The recognition processing operation unit 121-1 performs predetermined image analysis processing on an image signal supplied from the ISP 102-1 and supplies a recognition processing result (self-recognition processing result) thereby obtained to the recognition processing result saving unit 124-1. The recognition processing operation unit 121-1 also causes the recognition processing result queue 104B-1 to keep the recognition processing result (self-recognition processing result).

The recognition processing result saving unit 124-1 saves the recognition processing result (self-recognition processing result) supplied from the recognition processing operation unit 121-1. The recognition processing result saving unit 124-1 supplies the saved recognition processing result (self-recognition processing result) to the recognition processing result synthesis unit 122-1 at a predetermined timing.

Into the recognition processing result synthesis unit 122-1, the recognition processing result (self-recognition processing result) from the recognition processing result saving unit 124-1 and a recognition processing result (other recognition processing result) kept in the recognition processing result queue 104B-2 of the second series are simultaneously inputted at a timing to be processed (e.g., a timing of the same image frames). Note that the recognition processing result (other recognition processing result) kept in the recognition processing result queue 104B-2 of the second series is obtained by (the recognition processing operation unit 121-2 of) the recognition processing unit 103-2.

The recognition processing result synthesis unit 122-1 synthesizes the recognition processing result (self-recognition processing result) supplied from the recognition processing result saving unit 124-1 and the recognition processing result (other recognition processing result) from the recognition processing result queue 104B-2 and causes the recognition processing result queue 104A-1 to keep a recognition processing result (synthesized recognition processing result) thereby obtained.

Meanwhile, in the second series, the recognition processing unit 103-2 is configured with the recognition processing operation unit 121-2, the recognition processing result synthesis unit 122-2 and the recognition processing result saving unit 124-2.

The recognition processing operation unit 121-2 performs predetermined image analysis processing on an image signal supplied from the ISP 102-2 and supplies a recognition processing result (self-recognition processing result) thereby obtained to the recognition processing result saving unit 124-2. The recognition processing operation unit 121-2 also causes the recognition processing result queue 104B-2 to keep the recognition processing result (self-recognition processing result).

The recognition processing result saving unit 124-2 saves the recognition processing result (self-recognition processing result) supplied from the recognition processing operation unit 121-2. The recognition processing result saving unit 124-2 supplies the saved recognition processing result (self-recognition processing result) to the recognition processing result synthesis unit 122-2 at a predetermined timing.

Into the recognition processing result synthesis unit 122-2, the recognition processing result (self-recognition processing result) from the recognition processing result saving unit 124-2 and the recognition processing result (other recognition processing result) kept in the recognition processing result queue 104B-1 of the first series are simultaneously inputted at a timing to be processed (e.g., a timing of the same image frames). Note that the recognition processing result (other recognition processing result) kept in the recognition processing result queue 104B-1 of the first series is obtained by (the recognition processing operation unit 121-1 of) the recognition processing unit 103-1.

The recognition processing result synthesis unit 122-2 synthesizes the recognition processing result (self-recognition processing result) supplied from the recognition processing result saving unit 124-2 and the recognition processing result (other recognition processing result) from the recognition processing result queue 104B-1 and causes the recognition processing result queue 104A-2 to keep a recognition processing result (synthesized recognition processing result) thereby obtained.

Note that the configuration of the image processing apparatus 10C in FIG. 8 other than those described above is similar to the configuration of the image processing apparatus 10A in FIG. 2.

The image processing apparatus 10C is configured as described above.

(Flow of Recognition Processing)

Next, the flow of the recognition processing according to the third embodiment, which is executed by the image processing apparatus 10C in FIG. 8, will be described with reference to the flowchart in FIG. 9.

In Steps S91-1 to S94-1, similarly to Steps S11-1 to S14-1 in FIG. 4, the captured images captured by the solid-state imaging element 101-1 of the first series are subjected to camera signal processing and resolution conversion processing, and the self-recognition processing result of the first series is obtained. In addition, in Steps S91-2 to S94-2, similarly to Steps S11-2 to S14-2 in FIG. 4, the captured images captured by the solid-state imaging element 101-2 of the second series are subjected to camera signal processing and resolution conversion processing, and the self-recognition processing result of the second series is obtained.

In Step S95-1, the recognition processing result saving unit 124-1 of the first series saves the recognition processing result (self-recognition processing result) of the first series supplied from the recognition processing operation unit 121-1.

In Step S96-1, determined is whether the self-recognition processing result being saved by the recognition processing result saving unit 124-1 of the first series becomes the same timing as the other recognition processing result kept in the recognition processing result queue 104B-2 of the second series (e.g., a timing of the same image frames) and is the timing to be processed by the recognition processing result synthesis unit 122-1. That is, by setting the timing of the self-recognition processing result of the self-series with reference to the other recognition processing result of other series, a temporal gap between the self-recognition processing result and the other recognition processing result is guaranteed.

In Step S96-1, in case where the self-recognition processing result of the first series is determined to be not the same timing as the other recognition processing result of the second series, the determination processing in Step S96-1 is repeated. Then, in a case where the self-recognition processing result of the first series and the other recognition processing result of the second series are determined to be the same timing, the processing proceeds to Step S97-1.

In Step S97-1, the recognition processing result saving unit 124-1 of the first series supplies the saved self-recognition processing result to the recognition processing result synthesis unit 122-1. Thus, the self-recognition processing result of the first series and the other recognition processing result of the second series are simultaneously inputted into the recognition processing result synthesis unit 122-1 at the timing to be processed (e.g., at the timing of the same image frames).

When the processing in Step S97-1 ends, the processing proceeds to Step S98-1.

In Steps S98-1 to S107-1, similarly to Steps S16-1 to 25-1 in FIG. 4, in a case where the self-recognition processing result and the other recognition processing result are determined to be synthesizable, the self-recognition processing result of the first series and the other recognition processing result of the second series, which are simultaneously inputted at the timing to be processed (e.g., a timing of the same image frames), are synthesized and outputted by the recognition processing result synthesis unit 122-1.

In addition, in Steps S98-1 to S107-1, similarly to Steps S16-1 to 25-1 in FIG. 4, in a case where the self-recognition processing result and the other recognition processing result are not synthesizable, the recognition processing result synthesis unit 122-1 does not perform the synthesis processing on the self-recognition processing result and the other recognition processing result, and the self-recognition processing result from the first recognition processing operation unit 121-1 of the first series is outputted.

Figure 9:
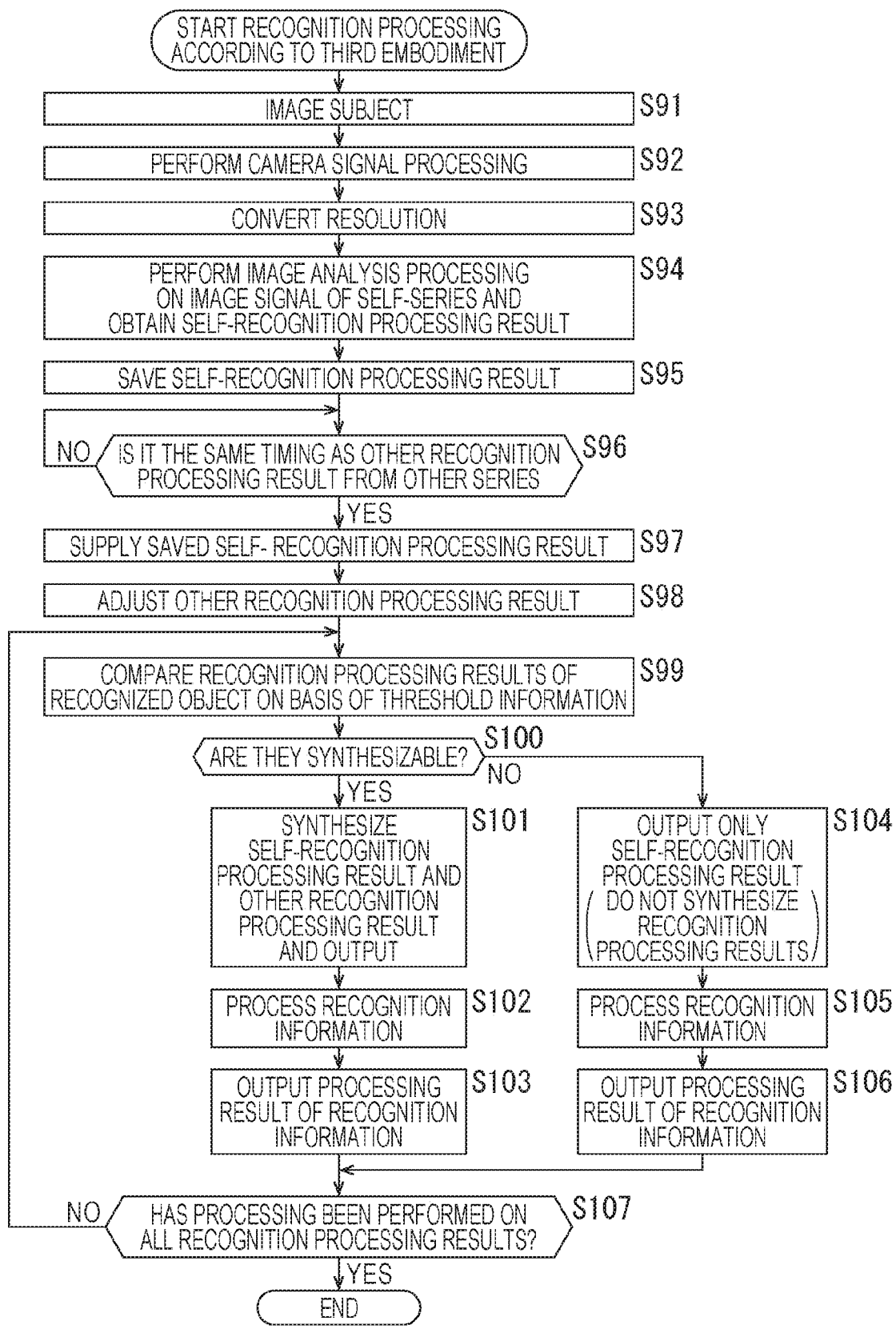
FIG. 9 is a flowchart for explaining a flow of recognition processing according to the third embodiment.

When the processing in Step S107 (S107-1) ends, the recognition processing according to the third embodiment in FIG. 9 is ended.

Note that the case of the independent processing performed in the first series has been described in the above description. In a case of the independent second series, the similar processing is performed in which the recognition processing result of the second series is the self-recognition processing result, and the recognition processing result of the first series is the other recognition processing result.

The flow of the recognition processing according to the third embodiment has been described above. In this recognition processing according to the third embodiment, not only the self-recognition processing result recognized in the self-series but also the other recognition processing result recognized in other series are synthesized in each series. Thus, the accuracy of the recognition results of the current object (object) included in the captured images (image frames) can be improved. Moreover, in the third embodiment, as compared with the first embodiment, the synthesis processing is performed according to the timings of the recognition processing results. Thus, a temporal gap between the self-recognition processing result of the self-series and the other recognition processing result of the other series can be guaranteed.

(4) Fourth Embodiment: Configuration for Performing Recognition Processing at Timing According to Delay Information (Configuration Example of Image Processing Apparatus)

Figure 10:
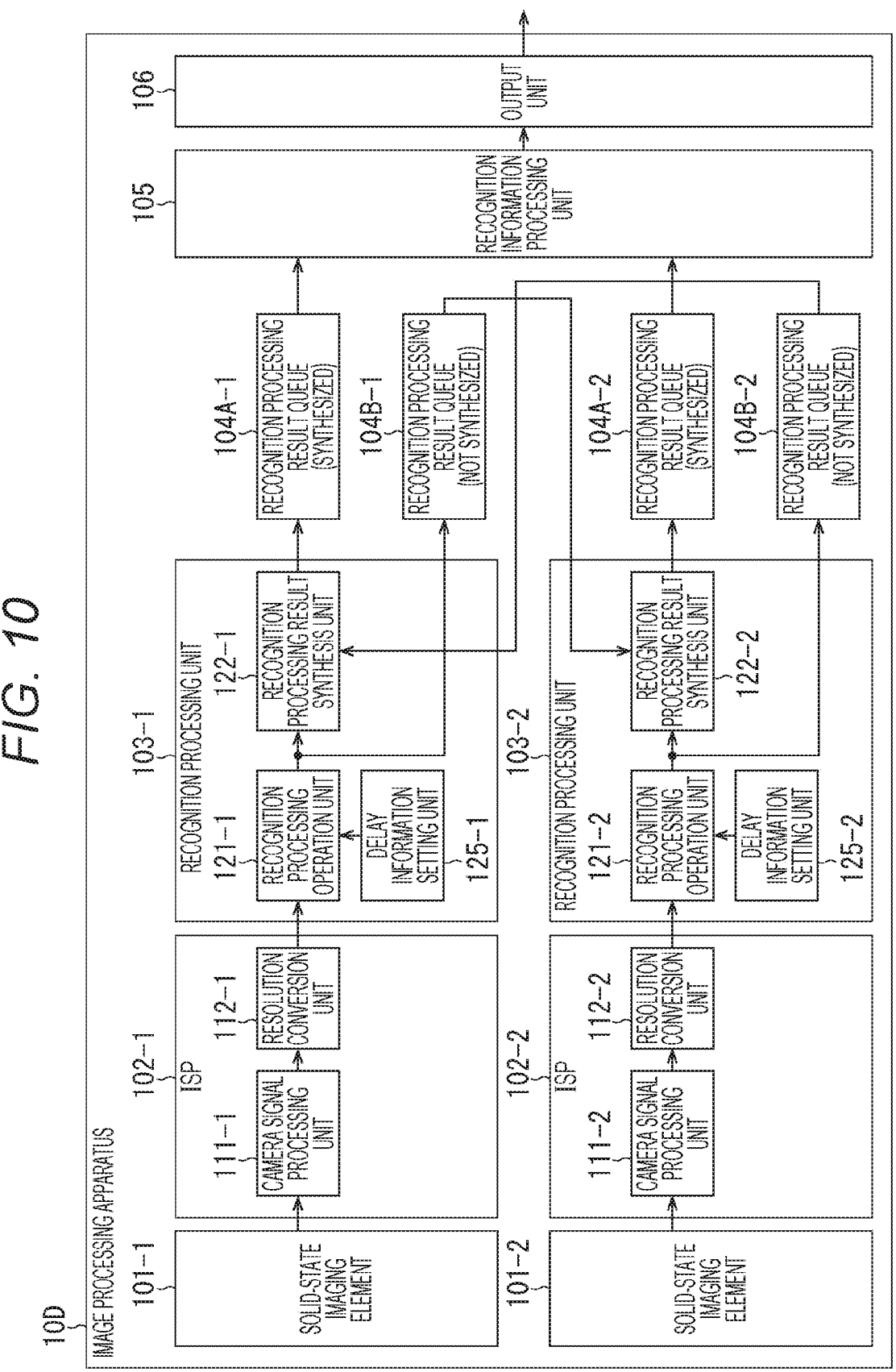
FIG. 10 is a diagram showing a configuration example of an image processing apparatus according to a fourth embodiment.

FIG. 10 is a diagram showing a configuration example of the image processing apparatus 10D according to the fourth embodiment.

In FIG. 10, the image processing apparatus 10D is configured with the first series, which includes a solid-state imaging element 101-1, an ISP 102-1, a recognition processing unit 103-1, a recognition processing result queue 104A-1 and a recognition processing result queue 104B-1, the second series, which includes a solid-state imaging element 101-2, an ISP 102-2, a recognition processing unit 103-2, a recognition processing result queue 104A-2 and a recognition processing result queue 104B-2, and a recognition information processing unit 105 and an output unit 106 for processing the outputs from the first series and the second series.

Note that, in the image processing apparatus 10D in FIG. 10, parts corresponding to those of the image processing apparatus 10A in FIG. 2 are denoted by the same reference signs, and the descriptions thereof will be omitted as appropriate to avoid the redundancy.

That is, the image processing apparatus 10D in FIG. 10 is different from the image processing apparatus 10A in FIG. 2 in that a delay information setting unit 125-1 is additionally provided in the recognition processing unit 103-1 of the first series in addition to a recognition processing operation unit 121-1 and a recognition processing result synthesis unit 122-1.

In addition, the image processing apparatus 10D in FIG. 10 is different from the image processing apparatus 10A in FIG. 2 in that a delay information setting unit 125-2 is additionally provided in the recognition processing unit 103-2 of the second series in addition to a recognition processing operation unit 121-2 and a recognition processing result synthesis unit 122-2.

Note that, also in the fourth embodiment, similarly to the first embodiment previously mentioned, for example, processing can be performed on captured images (image frames) at a low frame rate (e.g., one fps or the like) and with high resolution (e.g., high definition (HD) or the like) in the first series while processing can be performed on captured images (image frames) at a high frame rate (e.g., 60 fps or the like) and with low resolution (e.g., standard definition (SD) or the like) in the second series.

In the first series, the recognition processing unit 103-1 is configured with the recognition processing operation unit 121-1, the recognition processing result synthesis unit 122-1 and the delay information setting unit 125-1.

The delay information setting unit 125-1 sets, in the recognition processing operation unit 121-1, delay information for the processing time of the recognition processing operation unit 121-2 of the recognition processing unit 103-2 of the second series. Note that this delay information is obtained, for example, by measuring in advance the time required for the recognition processing (on other recognition processing result) performed in the recognition processing operation unit 121-2 of the second series.

The recognition processing operation unit 121-1 performs predetermined image analysis processing on an image signal supplied from the ISP 102-1 and supplies a recognition processing result (self-recognition processing result) thereby obtained to the recognition processing result synthesis unit 122-1. The recognition processing operation unit 121-1 also causes the recognition processing result queue 104B-1 to keep the recognition processing result (self-recognition processing result).

However, in the recognition processing operation unit 121-1, the start timing of the recognition processing (on the self-recognition processing result) is delayed according to the delay information set by the delay information setting unit 125-1. Accordingly, the recognition processing (on the self-recognition processing result) is performed after the recognition processing (on the other recognition processing result) performed by the recognition processing operation unit 121-2 of the second series ends.

The recognition processing result synthesis unit 122-1 synthesizes the recognition processing result (self-recognition processing result) supplied from the recognition processing operation unit 121-1 and the recognition processing result (other recognition processing result) from the recognition processing result queue 104B-2 and causes the recognition processing result queue 104A-1 to keep a recognition processing result (synthesized recognition processing result) thereby obtained. Note that the recognition processing result (other recognition processing result) kept in the recognition processing result queue 104B-2 of the second series is obtained by (the recognition processing operation unit 121-2 of) the recognition processing unit 103-2.

Meanwhile, in the second series, the recognition processing unit 103-2 is configured with the recognition processing operation unit 121-2, the recognition processing result synthesis unit 122-2 and the delay information setting unit 125-2.

The delay information setting unit 125-2 sets, in the recognition processing operation unit 121-2, delay information for the processing time of the recognition processing operation unit 121-1 of the recognition processing unit 103-1 of the first series. Note that this delay information is obtained, for example, by measuring in advance the time required for the recognition processing (on the other recognition processing result) performed by the recognition processing operation unit 121-1 of the first series.

The recognition processing operation unit 121-2 performs predetermined image analysis processing on an image signal supplied from the ISP 102-2 and supplies a recognition processing result (self-recognition processing result) thereby obtained to the recognition processing result synthesis unit 122-2. The recognition processing operation unit 121-2 also causes the recognition processing result queue 104B-2 to keep the recognition processing result (self-recognition processing result).

However, in the recognition processing operation unit 121-2, the start timing of the recognition processing (on the self-recognition processing result) is delayed according to the delay information set by the delay information setting unit 125-2. Accordingly, the recognition processing (on the self-recognition processing result) is performed after the recognition processing (on the other recognition processing result) performed by the recognition processing operation unit 121-1 of the first series ends.

The recognition processing result synthesis unit 122-2 synthesizes the recognition processing result (self-recognition processing result) supplied from the recognition processing operation unit 121-2 and the recognition processing result (other recognition processing result) from the recognition processing result queue 104B-1 and causes the recognition processing result queue 104A-2 to keep a recognition processing result (synthesized recognition processing result) thereby obtained. Note that the recognition processing result (other recognition processing result) kept in the recognition processing result queue 104B-1 of the first series is obtained by (the recognition processing operation unit 121-1 of) the recognition processing unit 103-1.

Herein, the delay information is information for delaying one of the recognition processing of the first series and the recognition processing of the second series and set by one of the delay information setting unit 125-1 and the delay information setting unit 125-2. That is, in a case where the delay information setting unit 125-1 sets the delay information in the recognition processing operation unit 121-1, the delay information setting unit 125-2 does not set the delay information in the recognition processing operation unit 121-2. On the other hand, in a case where the delay information setting unit 125-2 sets the delay information in the recognition processing operation unit 121-2, the delay information setting unit 125-1 does not set the delay information in the recognition processing operation unit 121-1.

Note that the configuration of the image processing apparatus 10D in FIG. 10 other than those described above is similar to the configuration of the image processing apparatus 10A in FIG. 2.

The image processing apparatus 10D is configured as described above.

(Flow of Recognition Processing)

Next, the flow of the recognition processing according to the fourth embodiment, which is executed by the image processing apparatus 10D in FIG. 10, will be described with reference to the flowchart in FIG. 11.

In Steps S131-1 to S133-1, similarly to Steps S11-1 to S13-1 in FIG. 4, the captured images captured by the solid-state imaging element 101-1 of the first series are subjected to camera signal processing and resolution conversion processing. In addition, in Steps S131-2 to S133-2, similarly to Steps S11-2 to S13-2 in FIG. 4, the captured images captured by the solid-state imaging element 101-2 of the second series are subjected to camera signal processing and resolution conversion processing.

In Step S134-1, the delay information setting unit 125-1 of the first series sets, in the recognition processing operation unit 121-1, the delay information for the processing time of the recognition processing operation unit 121-2 of the recognition processing unit 103-2 of the second series.

In Step S135-1, the recognition processing operation unit 121-1 of the first series determines whether or not the time indicated by the delay information set by the delay information setting unit 125-1 has elapsed. In a case where the time indicated by the delay information is determined to be not elapsed in Step S135-1, the determination processing in Step S135-1 is repeated. Thereafter, in a case where the time indicated by the delay information is determined to be elapsed in Step S135-1, the processing proceeds to Step S136-1.

In Step S136-1, the recognition processing operation unit 121-1 of the first series performs the predetermined image analysis processing on the image signal supplied from the resolution conversion unit 112-1 and obtains the self-recognition processing result.

However, in the recognition processing operation unit 121-1 of the first series, the start timing of the recognition processing (on the self-recognition processing result) is delayed according to the delay information set by the delay information setting unit 125-1. Accordingly, the recognition processing (on the self-recognition processing result) is performed after the recognition processing (S136-2) (on the other recognition processing result) performed by the recognition processing operation unit 121-2 of the second series ends.

When the processing in Step S136-1 ends, the processing proceeds to Step S137-1.

In Steps S137-1 to S147-1, similarly to Steps S15-1 to S25-1 in FIG. 4, in a case where the self-recognition processing result and the other recognition processing result are determined to be synthesizable, the self-recognition processing result of the first series and the other recognition processing result of the second series are synthesized and outputted by the recognition processing result synthesis unit 122-1.

In addition, in Steps S137-1 to S147-1, similarly to Steps S15-1 to S25-1 in FIG. 4, in a case where the self-recognition processing result and the other recognition processing result are not synthesizable, the recognition processing result synthesis unit 122-1 does not perform the synthesis processing on the self-recognition processing result and the other recognition processing result, and the self-recognition processing result from the first recognition processing operation unit 121-1 of the first series is outputted.

Figure 11:
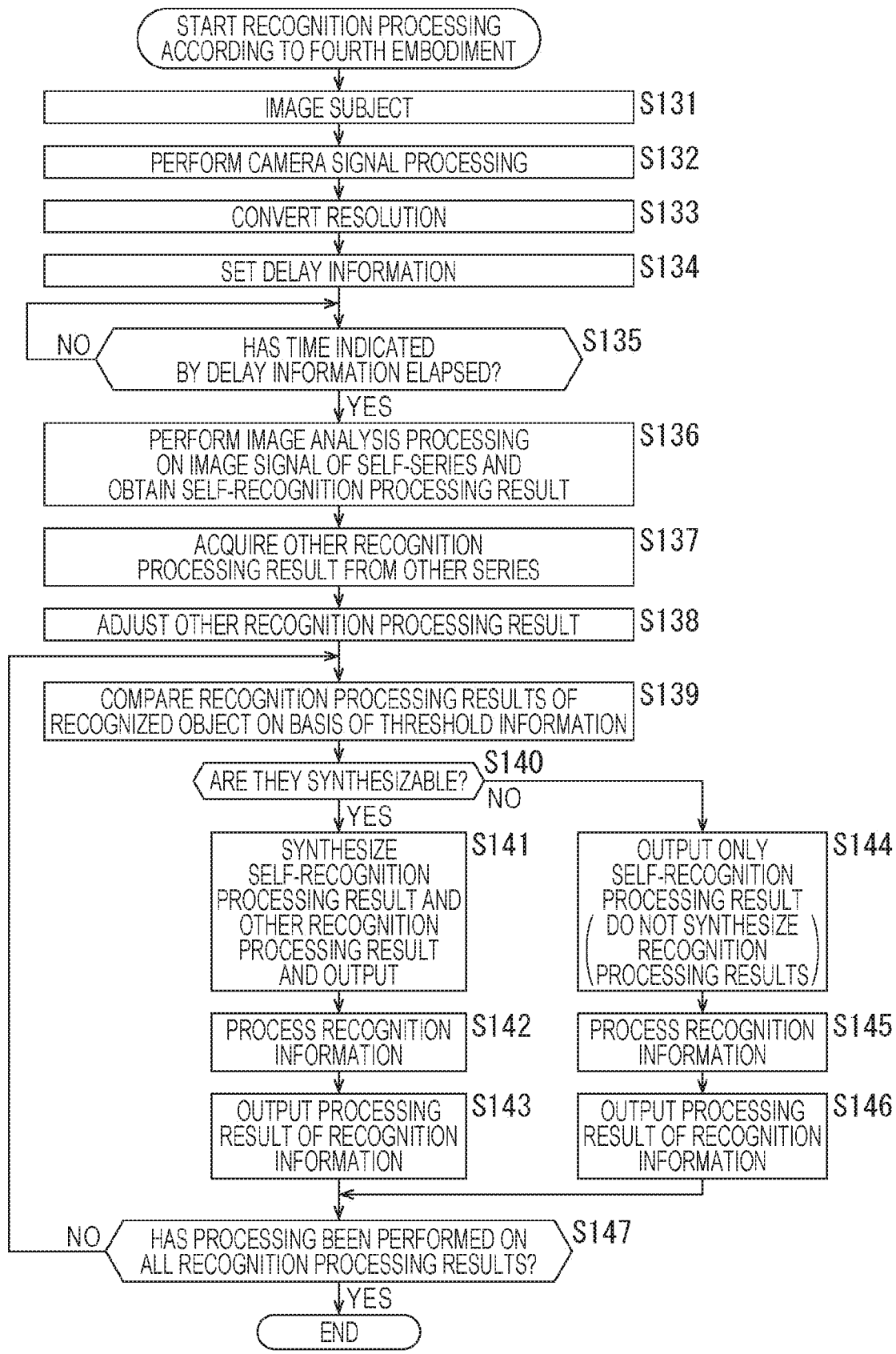
FIG. 11 is a flowchart for explaining a flow of recognition processing according to the fourth embodiment.

When the processing in Step S147 (S147-1) ends, the recognition processing according to the fourth embodiment in FIG. 11 is ended.

Note that the case of the independent processing performed in the first series has been described in the above description. In a case of the independent second series, the similar processing is performed in which the recognition processing result of the second series is the self-recognition processing result, and the recognition processing result of the first series is the other recognition processing result.

The flow of the recognition processing according to the fourth embodiment has been described above. In this recognition processing according to the fourth embodiment, not only the self-recognition processing result recognized in the self-series but also the other recognition processing result recognized in other series are synthesized in each series. Thus, the accuracy of the recognition results of the current object (object) included in the captured images (image frames) can be improved. Moreover, in the fourth embodiment, as compared with the first embodiment, the recognition processing is performed at the timing according to the delay information in one series so that the recognition processing of other series can be performed after the recognition processing of one series ends, and the real time property can be improved.

3. Modification Example (Another Configuration Example of Image Processing Apparatus)

Figure 12:
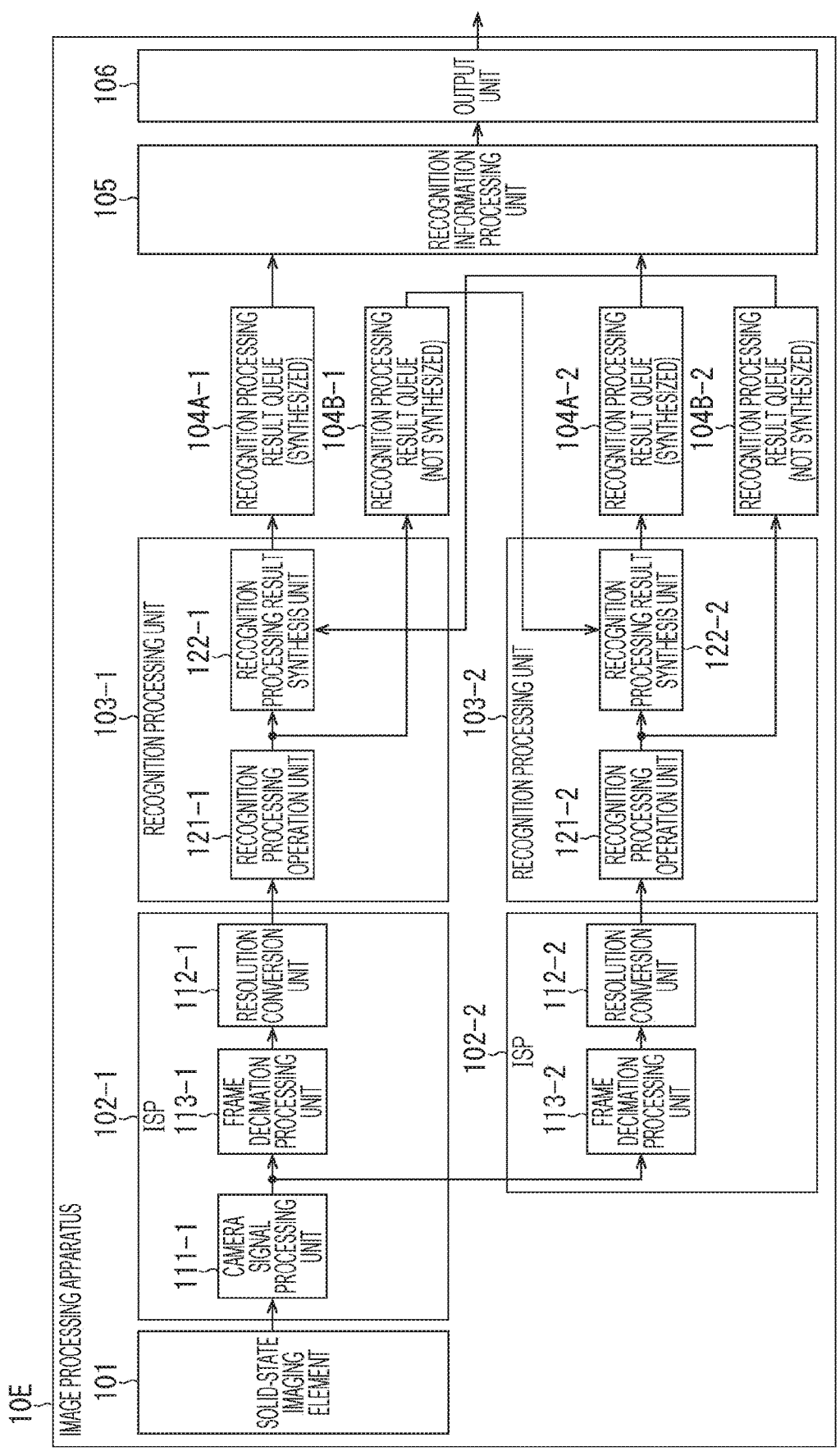
FIG. 12 is a diagram showing another configuration example of the image processing apparatus.

FIG. 12 is a diagram showing another configuration example of the image processing apparatus 10.

In FIG. 12, an image processing apparatus 10E is different from the image processing apparatus 10A in FIG. 2 in that a solid-state imaging element 101, which is common to the first series and the second series, is provided instead of the solid-state imaging element 101-1 of the first series and the solid-state imaging element 101-2 of the second series. Moreover, a camera signal processing unit 111-1 of an ISP 102-1 of the first series is commonly used by the first series and the second series. Furthermore, a frame decimation processing unit 113-1 is provided before a resolution conversion unit 112-1 in the ISP 102-1 of the first series, and a frame decimation processing unit 113-2 is provided before a resolution conversion unit 112-2 in an ISP 102-2 of the second series.

The solid-state imaging element 101 in FIG. 12 can change the frame rate of captured images (image frames) by working according to a clock inputted from the outside or a clock generated inside thereof, and the solid-state imaging element 101 in FIG. 12 can generate image frames at different frame rates according to two kinds of clocks. For example, the solid-state imaging element 101 in FIG. 12 generates and outputs image frames at a low frame rate and image frames at a high frame rate.

Then, the camera signal processing unit 111-1 of the ISP 102-1 subjects (an image signal of) the image frames at the low frame rate and (an image signal of) the image frames at the high frame rate to camera signal processing. (The image signal of) the image frames at the low frame rate are inputted into the resolution conversion unit 112-1 of the ISP 102-1 of the first series, and (the image signal of) the image frames at the high frame rate are inputted into the resolution conversion unit 112-2 of the ISP 102-2 of the second series.

However, by performing frame decimation processing with the frame decimation processing unit 113-1 of the ISP 102-1 of the first series and the frame decimation processing unit 113-2 of the ISP 102-2 of the second series, (the image signal of) the image frames at the low frame rate may be inputted into the resolution conversion unit 112-1, and (the image signal of) the image frames at the high frame rate may be inputted into the resolution conversion unit 112-2. In this case, the frame rate of the image frames is dropped by the frame decimation processing unit 113-1 of the first series or the frame decimation processing unit 113-2 of the second series. Accordingly, the image frames at different frame rates can be recognized in the first series and the second series. This is effective for power saving.

For example, in a case where image frames at a constant frame rate (e.g., 60 fps or the like) are outputted from the solid-state imaging element 101, the frame decimation processing unit 113-1 of the first series performs the frame decimation processing on (the image signal of) the image frames from the camera signal processing unit 111-1 (e.g., drop the frame rate from 60 fps to one fps) so that the image frames are inputted into the resolution conversion unit 112-1 as image frames at a low frame rate. On the other hand, for example, the frame decimation processing unit 113-2 of the second series inputs (the image signal of) the image frames from the camera signal processing unit 111-1 with the original frame rate (e.g., 60 fps as the original) into the resolution conversion unit 112-2 as image frames at a high frame rate.

Note that, in a case where the frame rates of the image frames are made different in the first series and the second series by the frame decimation processing of the frame decimation processing unit 113-1 of the first series and the frame decimation processing unit 113-2 of the second series, the solid-state imaging element 101 may output image frames at a constant frame rate or may output image frames at different frame rates.

Moreover, in a case where the image frames at different frame rates are outputted by the solid-state imaging element 101, the frame decimation processing unit 113-1 of the first series and the frame decimation processing unit 113-2 of the second series may be not provided. Furthermore, depending on the frame rates of the image frames processed in the first series and the second series, only one frame decimation processing unit 113 of the frame decimation processing unit 113-1 of the first series and the frame decimation processing unit 113-2 of the second series may be provided.

The resolution conversion unit 112-1 of the first series subjects (the image signal of) the image frames at a low frame rate inputted therein to resolution conversion processing, thereby generating image frames with high resolution. On the other hand, the resolution conversion unit 112-2 of the second series subjects (the image signal of) the image frames at a high frame rate inputted therein to resolution conversion processing, thereby generating image frames with low resolution.

Thus, processing can be performed on image frames at a low frame rate (e.g., one fps or the like) and with high resolution (e.g., high definition (HD) or the like) in the first series while processing can be performed on image frames at a high frame rate (e.g., 60 fps or the like) and with low resolution (e.g., standard definition (SD) or the like) in the second series.

As described above, even if the solid-state imaging element 101-1 and the solid-state imaging element 101-2 are not respectively provided in the first series and the second series, the solid-state imaging element 101 capable of generating the image frames at a plurality of frame rates can provide a plurality of image frames with different output information processed in each series.

(Still Another Configuration Example of Image Processing Apparatus)

Figure 13:
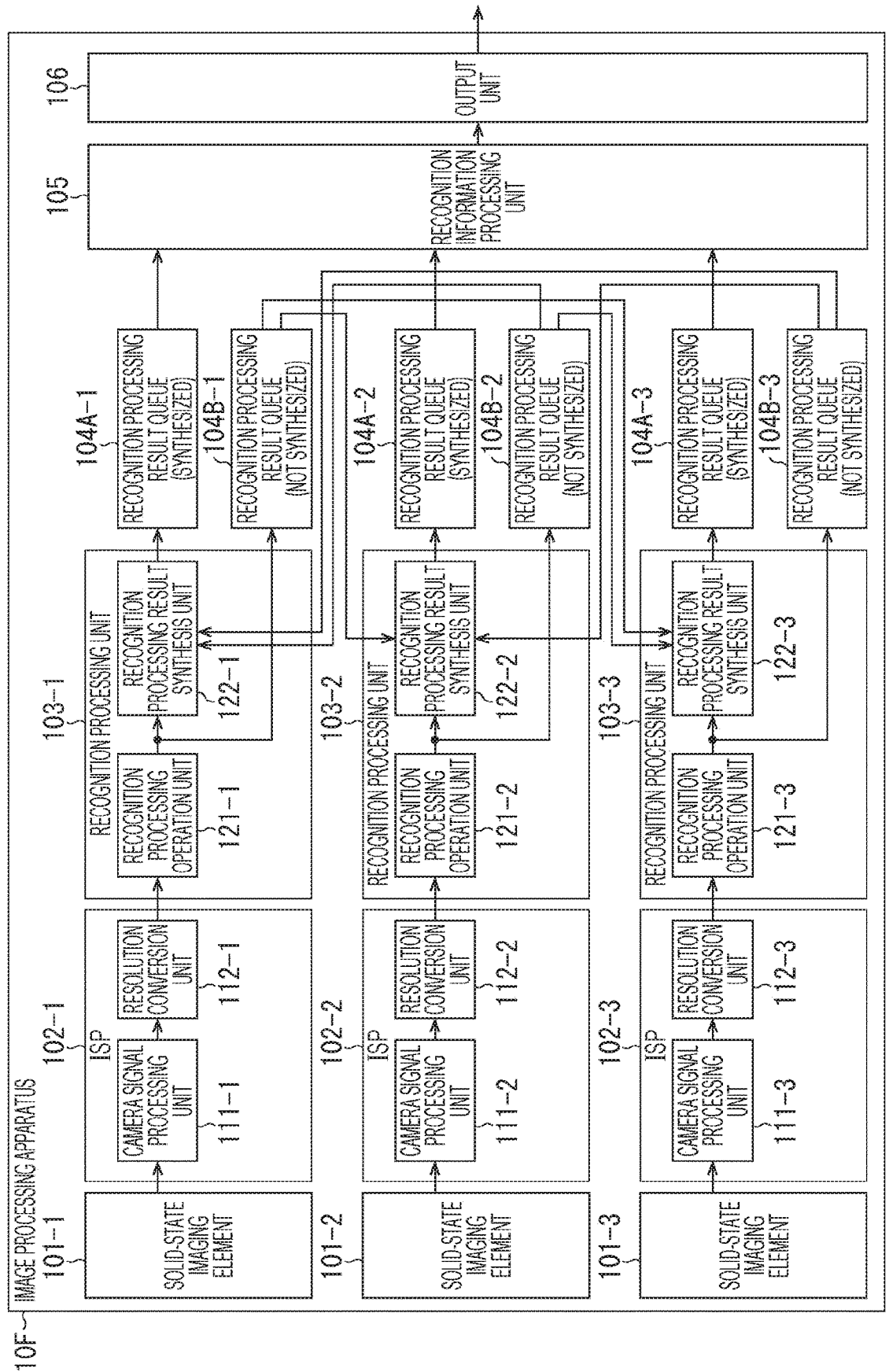
FIG. 13 is a diagram showing still another configuration example of the image processing apparatus.

FIG. 13 is a diagram showing still another configuration example of the image processing apparatus 10.

In FIG. 13, an image processing apparatus 10F is different from the image processing apparatus 10A in FIG. 2 in that a third series, which includes a solid-state imaging element 101-3, an ISP 102-3, a recognition processing unit 103-3, a recognition processing result queue 104A-3 and a recognition processing result queue 104B-3, is included in addition to the first series and the second series.

In the image processing apparatus 10F in FIG. 13, blocks configuring the third series have the functions similar to those of the blocks configuring the first series or the second series.

For example, processing is performed on image frames at a low frame rate (e.g., one fps or the like) and with high resolution (e.g., high definition (HD) or the like) in the first series and processing is performed on image frames at a high frame rate (e.g., 60 fps or the like) and with low resolution (e.g., standard definition (SD) or the like) in the second series while processing is performed on image frames at an intermediate frame rate (e.g., 30 fps or the like) and with an intermediate resolution (e.g., resolution between SD and HD) in the third series.

Thus, in the image processing apparatus 10F in FIG. 13, in the first series, the second series and the third series, the self-recognition processing result recognized in the self-series and the other recognition processing results recognized in other two series are synthesized so that more accurate recognition processing results (synthesized recognition processing results) can be obtained. For example, in the first series, in addition to the self-recognition processing result recognized in the self-series, the other recognition processing result recognized in the second series and the other recognition processing result recognized in the third series can be used.

Note that, in the image processing apparatus 10F in FIG. 13, three series of the first series to the third series have been described, but the similar applies to series of four or more.

Moreover, a solid-state imaging element 101 capable of generating images frames at a plurality of frame rates may be provided as shown in FIG. 12, instead of the solid-state imaging element 101-1 of the first series, the solid-state imaging element 101-2 of the second series, and the solid-state imaging element 101-3 of the third series.

(Another Configuration Example of Image Processing System)

Figure 14:
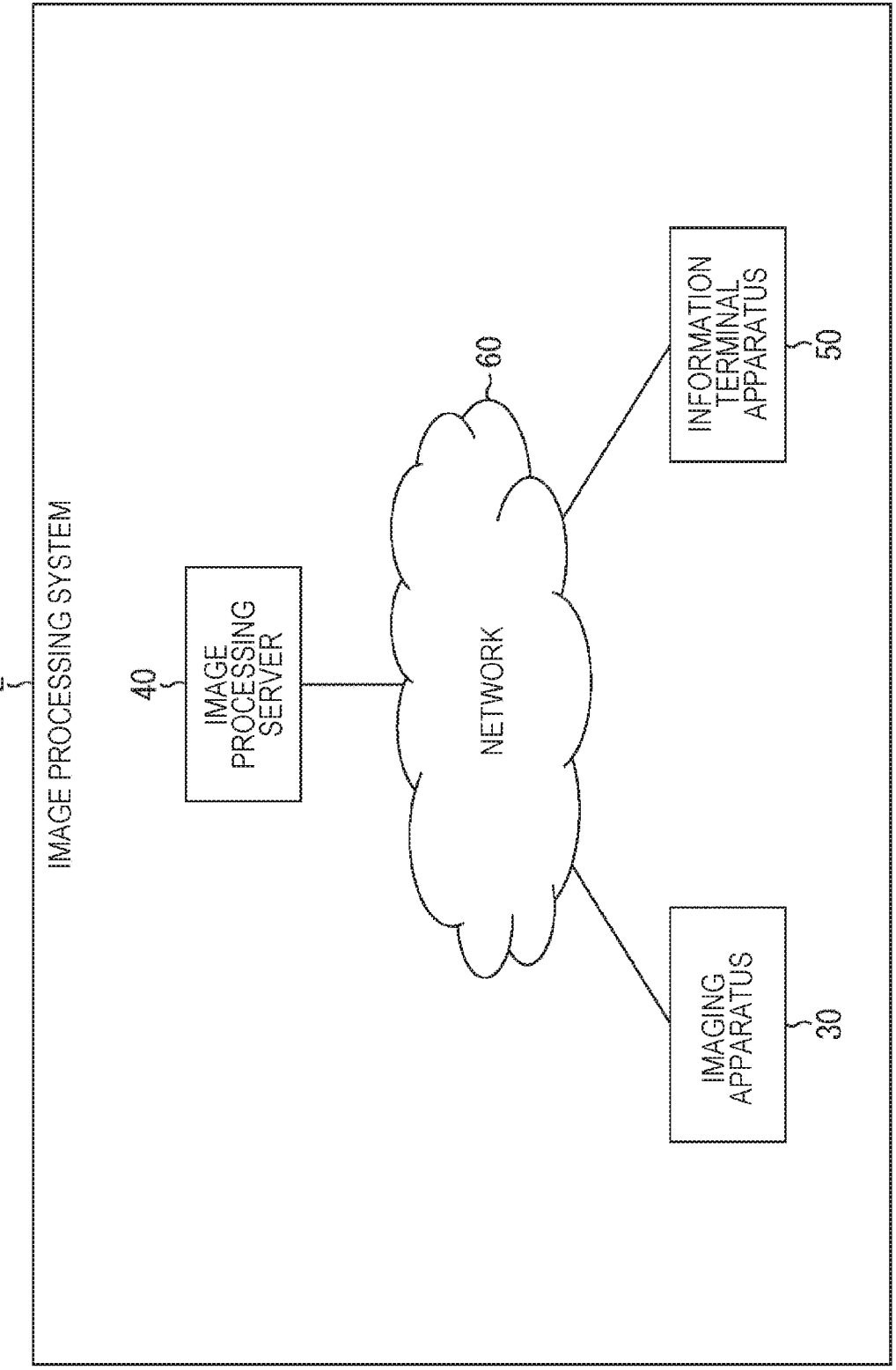
FIG. 14 is a diagram showing another configuration example of the image processing system.

FIG. 14 is a diagram showing another configuration example of the image processing system.

In FIG. 14, an image processing system 2 is configured with an imaging apparatus 30, an image processing server 40 and an information terminal apparatus 50. In addition, in FIG. 14, the imaging apparatus 30, the image processing server 40 and the information terminal apparatus 50 are connected to each other via a network 60 including the Internet, a telephone network and the like.

For example, the imaging apparatus 30 can be configured by including the solid-state imaging element 101-1 and the ISP 102-1 in first series (FIG. 2) and the solid-state imaging element 101-2 and the ISP 102-2 in the second series (FIG. 2). The imaging apparatus 30 also has a communication function.

The imaging apparatus 30 generates the captured images (image frames) of the first series and the captured images (image frames) of the second series and transmits those to the image processing server 40 via the network 60.

The image processing server 40 can be configured by including, for example, the recognition processing unit 103-1, the recognition processing result queue 104A-1 and the recognition processing result queue 104B-1 in the first series (FIG. 2), the recognition processing unit 103-2, the recognition processing result queue 104A-2 and the recognition processing result queue 104B-2 in the second series (FIG. 2), and the recognition information processing unit 105 and the output unit 106 for processing the outputs from the first series and the second series. The image processing server 40 also has a communication function.

The image processing server 40 receives the captured images (image frames) of the first series and the captured images (image frames) of the second series transmitted from the imaging apparatus 30 via the network 60. In the image processing server 40, the recognition processing is performed on the captured images (image frames) from the imaging apparatus 30 in the first series, and the recognition processing result (self-recognition processing result) is obtained. In addition, in the image processing server 40, the recognition processing is also performed on the captured images (image frames) from the imaging apparatus 30 in the second series, and the recognition processing result (self-recognition processing result) is obtained.

Then, in the image processing server 40, in the first series and the second series, the self-recognition processing results recognized in the self-series and the other recognition processing results recognized in the other series are synthesized so that more accurate recognition processing results (synthesized recognition processing results) can be obtained. The image processing server 40 distributes, via the network 60, the recognition information according to the recognition processing results (synthesized recognition processing results) thereby obtained in response to a request from the information terminal apparatus 50.

For example, the information terminal apparatus 50 is an electronic device having a communication function, such as a mobile phone, a smartphone or a tablet terminal apparatus. The information terminal apparatus 50 requests the image processing server 40 for the recognition information via the network 60. Then, in response to the request for the recognition information, the information terminal apparatus 50 receives and displays the recognition information transmitted from the image processing server 40 via the network 60.

Note that the configuration of the image processing system 2 in FIG. 14 is one example, and other configurations can be adopted, for example, such that the imaging apparatus 30 and the image processing server 40 are configured as the same apparatus.

4. Computer Configuration

The sequences of processing described above can be executed by hardware or can be executed by software. In a case where the sequences of processing are executed by the software, a program configuring the software is installed in a computer. Herein, the computer includes a computer incorporated into dedicated hardware and, for example, a general-purpose personal computer capable of executing various functions by being installed with various programs.

Figure 15:
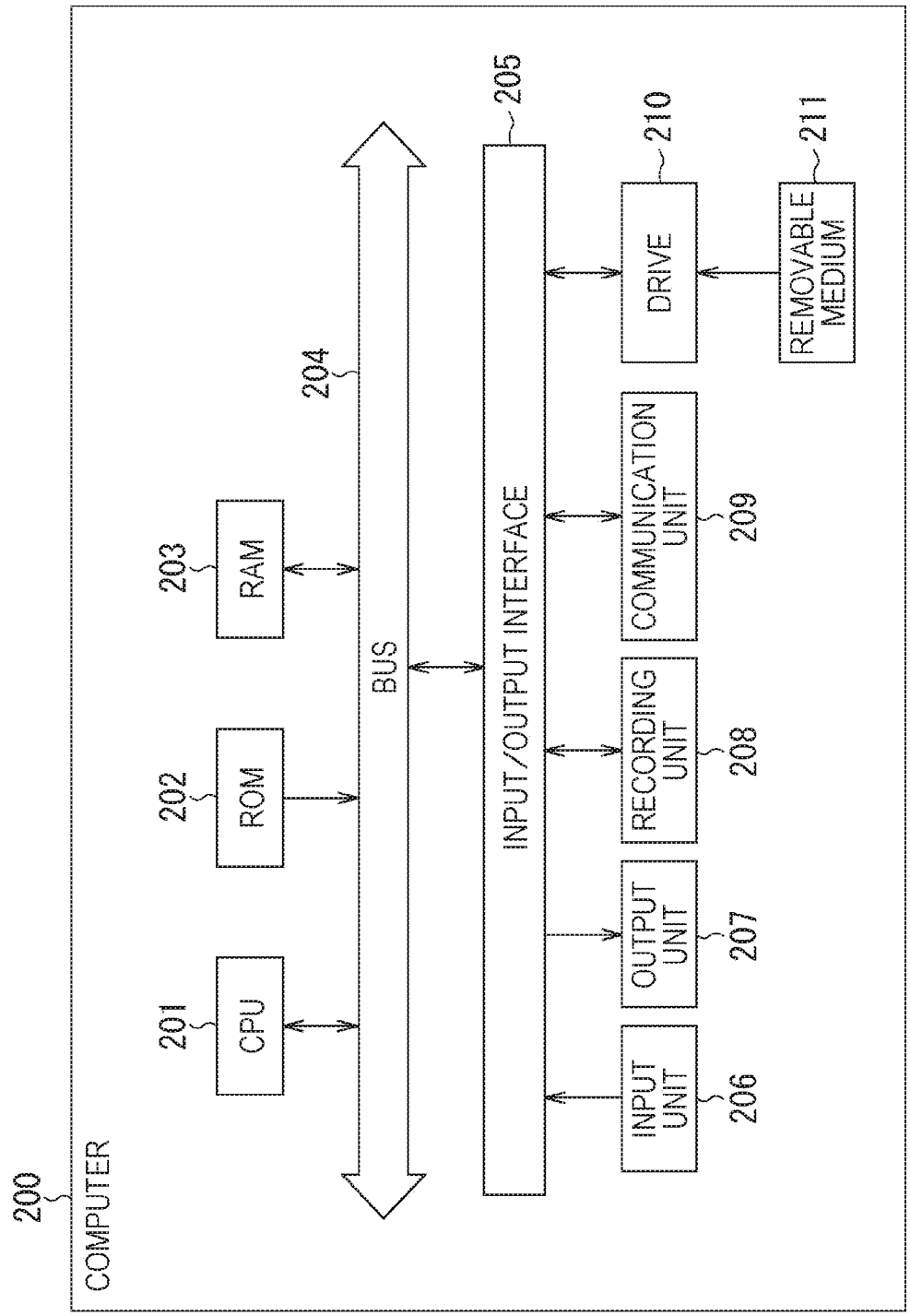
FIG. 15 is a diagram showing a configuration example of a computer.

FIG. 15 is a block diagram showing a configuration example of hardware of a computer which executes the aforementioned sequences of processing by a program.

In a computer 200, a central processing unit (CPU) 201, a read only memory (ROM) 202, and a random access memory (RAM) 203 are connected to each other by a bus 204. The bus 204 is further connected to an input/output interface 205. To the input/output interface 205, an input unit 206, an output unit 207, a recording unit 208, a communication unit 209 and a drive 210 are connected.

The input unit 206 includes a keyboard, a mouse, a microphone and the like. The output unit 207 includes a display, a speaker and the like. The recording unit 208 includes a hard disk, a nonvolatile memory and the like. The communication unit 209 includes a network interface and the like. The drive 210 drives a removable medium 211 such as a magnetic disk, an optical disk, a magneto-optical disk, or a semiconductor memory.

In the computer 200 configured as described above, the CPU 201 loads, for example, a program stored in the recording unit 208 into the RAM 203 via the input/output interface 205 and the bus 204 and executes the program, thereby performing the aforementioned sequences of the processing.

The program executed by the computer 200 (CPU 201) can be, for example, recorded in the removable medium 211 as a package medium or the like to be provided. Moreover, the program can be provided via a wired or wireless transmission medium such as a local area network, the Internet and digital satellite broadcasting.

In the computer 200, the program can be installed in the recording unit 208 via the input/output interface 205 by attaching the removable medium 211 to the drive 210. Furthermore, the program can be received by the communication unit 209 via the wired or wireless transmission medium and installed in the recording unit 208. In addition, the program can be installed in the ROM 202 or the recording unit 208 in advance.

Note that the program executed by the computer 200 may be a program in which the processing are performed in time series according to the order described in the present description, or may be a program in which the processing are performed in parallel or at necessary timings such as when a call is made.

Herein, in the present description, the processing steps that describe the program for causing the computer 200 to perform various processing are not necessarily processed in time series according to the order described as the flowcharts, and may include processing executed in parallel or individually (e.g., parallel processing or processing by an object).

Moreover, the program may be processed by one computer or may be distributed to be processed by a plurality of computers. Furthermore, the program may be transferred to a remote computer to be executed.

In addition, in the present description, the system means a group of a plurality of constituents (apparatuses, modules (components) and the like), and it does not matter whether all the constituents are in the same housing or not. Therefore, a plurality of apparatuses that are accommodated in separate housings and connected via a network, and one apparatus that accommodates a plurality of modules in one housing are both systems.

Note that the embodiments of the present technology are not limited to the above embodiments, and various modifications can be made in a scope without departing from the gist of the present technology. For example, the present technology can adopt a configuration of cloud computing in which one function is shared and collaboratively processed by a plurality of apparatuses via a network.

Moreover, each step described in the aforementioned flowcharts can be executed by one apparatus or can also be shared and executed by a plurality of apparatuses. Furthermore, in a case where a plurality of processing are included in one step, the plurality of processing included in the one step can be executed by one apparatus or can also be shared and executed by a plurality of apparatuses.

Note that the present technology may also adopt the following configurations.

(1)
An image processing apparatus including
a recognition processing unit which performs recognition processing on a current object on the basis of recognition results of the current object obtained from a plurality of captured images with different output information regarding imaging.

(2)
The image processing apparatus according to (1), in which the captured images are image frames generated in time series, and
the output information is information indicating at least one of resolutions of the captured images and frame rates of the captured images.

(3)
The image processing apparatus according to (2),
in which the recognition processing unit includes:
a recognition unit which performs recognition processing on the captured images outputted from an imaging unit of a same series; and
a synthesis unit which synthesizes a recognition result of the current object by the recognition unit and other recognition result of the current object included in the captured images outputted from an imaging unit of other series.

(4)
The image processing apparatus according to (3), in which the synthesis unit synthesizes the recognition result of the current object and the other recognition result of the current object in a case where the recognition result of the current object and the other recognition result of the current object are determined to be synthesized on the basis of threshold information serving as a determination reference as to whether or not to synthesize the recognition result of the current object and the other recognition result of the current object.

(5)
The image processing apparatus according to (4), in which the threshold information is information indicating an allowable range of deviation between a position of the current object included in the recognition result of the current object and a position of the current object included in the other recognition result of the current object, or information indicating an allowable range of a difference between a type of the current object included in the recognition result of the current object and a type of the current object included in the other recognition result of the current object.

(6)
The image processing apparatus according to any one of (3) to (5), in which the synthesis unit synthesizes the recognition result of the current object and the other recognition result of the current object after at least one recognition result of the recognition result of the current object and the other recognition result of the current object is adjusted to be in a synthesizable state.

(7)
The image processing apparatus according to (2), in which the recognition processing unit includes a recognition unit which performs, on the basis of other recognition result of the current object included in the captured images outputted from an imaging unit of other series, recognition processing on the captured images outputted from an imaging unit of a same series.

(8)
The image processing apparatus according to (3), in which the recognition processing unit further includes a saving unit which saves the recognition result of the current object by the recognition unit, and the synthesis unit synthesizes the recognition result of the current object being saved in the saving unit and the other recognition result of the current object at a predetermined timing.

(9)

The image processing apparatus according to (3), in which the recognition processing unit further includes a setting unit which sets delay information for a time required for recognition processing on the captured images outputted from the imaging unit of the other series, and the recognition unit performs, on the basis of the delay information set by the setting unit, the recognition processing on the captured images outputted from the imaging unit of the same series.

(10)

The image processing apparatus according to any one of (1) to (9), in which the plurality of the captured images are outputted from a plurality of imaging units.

(11)

The image processing apparatus according to any one of (1) to (9), in which the plurality of the captured images are outputted from one imaging unit.

(12)

An image processing method of an image processing apparatus, the method including:

a step of performing recognition processing on a current object on the basis of recognition results of the current object obtained from a plurality of captured images with different output information regarding imaging, by the image processing apparatus.

(13)

A program, which causes a computer to function as a recognition processing unit which performs recognition processing on a current object on the basis of recognition results of the current object obtained from a plurality of captured images with different output information regarding imaging.

REFERENCE SIGNS LIST 1, 2 Image processing system
10 Image processing apparatus
20 Output apparatus
30 Imaging apparatus
40 Image processing server
50 Information terminal apparatus
60 Network
101 Solid-state imaging element
102 ISP
104A, 104B Recognition processing result queue
105 Recognition information processing unit
106 Output unit
111 Camera signal processing unit
112 Resolution conversion unit
113 Frame decimation processing unit
121 Recognition processing operation unit (first recognition processing operation unit)
122 Recognition processing result synthesis unit
123 Second recognition processing operation unit
124 Recognition processing result saving unit
125 Delay information setting unit
131 Recognition result acquisition unit
132 Recognition result adjustment unit
133 Synthesis determination unit
134 Recognition result synthesis unit
135 Processing result output unit
200 Computer
201 CPU

The invention claimed is:

1. An image processing apparatus, comprising:
a central processing unit (CPU) configured to:
acquire a first plurality of captured images of a specific object from a first imaging element, wherein
the first plurality of captured images is a plurality of image frames generated in time series,
first output information of the first plurality of captured images is different from second output information of a second plurality of captured images of the specific object,
the second plurality of captured images of the specific object is captured by a second imaging element,
the first output information is associated with an imaging operation of the first plurality of captured images, and
the second output information is associated with an imaging operation of the second plurality of captured images;
execute a recognition process on the first plurality of captured images of the specific object;
output a first recognition result of the specific object based on the execution of the recognition process; and
synthesize the first recognition result and a second recognition result of the specific object, wherein the second recognition result of the specific object is based on the second plurality of captured images.

2. The image processing apparatus according to claim 1, wherein
the first output information indicates at least one of a resolution of each captured image of the first plurality of captured images or a frame rate of each captured image of the first plurality of captured images.

3. The image processing apparatus according to claim 2, wherein the CPU is further configured to execute the recognition process on the first plurality of captured images based on the second recognition result of the specific object in the second plurality of captured images.

4. The image processing apparatus according to claim 1, wherein the CPU is further configured to:
determine, based on threshold information, that the first recognition result and the second recognition result are to be synthesized; and
synthesize the first recognition result and the second recognition result based on the determination.

5. The image processing apparatus according to claim 4, wherein the threshold information indicates one of:
an allowable range of deviation between a position of the specific object in the first recognition result and a position of the specific object in the second recognition result, or
an allowable range of a difference between a type of the specific object in the first recognition result and a type of the specific object in the second recognition result.

6. The image processing apparatus according to claim 1, wherein the CPU is further configured to:
adjust at least one of the first recognition result or the second recognition result such that the at least one of the first recognition result or the second recognition result is in a synthesizable state; and
synthesize the first recognition result and the second recognition result after the adjustment.

7. The image processing apparatus according to claim 1, further comprising a memory configured to store the first recognition result, wherein the CPU is further configured to synthesize the stored first recognition result and the second recognition result at a specific time.

8. The image processing apparatus according to claim 1, wherein the CPU is further configured to:
set delay information for a time required for execution of the recognition process on the second plurality of captured images; and
execute the recognition process on the first plurality of captured images based on the set delay information.

9. An image processing method, comprising:
acquiring a first plurality of captured images of a specific object from a first imaging element, wherein
the first plurality of captured images is a plurality of image frames generated in time series,
first output information of the first plurality of captured images is different from second output information of a second plurality of captured images of the specific object,
the second plurality of captured images of the specific object is captured by a second imaging element,
the first output information is associated with an imaging operation of the first plurality of captured images, and
the second output information is associated with an imaging operation of the second plurality of captured images;
executing a recognition process on the first plurality of captured images of the specific object;
outputting a first recognition result of the specific object based on the execution of the recognition process; and
synthesizing the first recognition result and a second recognition result of the specific object, wherein the second recognition result of the specific object is based on the second plurality of captured images.

10. A non-transitory computer-readable medium, having stored thereon computer-executable instructions, which when executed by a processor, cause the processor to execute operations, the operations comprising:
acquiring a first plurality of captured images of a specific object from a first imaging element, wherein
the first plurality of captured images is a plurality of image frames generated in time series,
first output information of the first plurality of captured images is different from second output information of a second plurality of captured images of the specific object,
the second plurality of captured images of the specific object is captured by a second imaging element,
the first output information is associated with an imaging operation of the first plurality of captured images, and
the second output information is associated with an imaging operation of the second plurality of captured images;
executing a recognition process on the first plurality of captured images of the specific object;
outputting a first recognition result of the specific object based on the execution of the recognition process; and
synthesizing the first recognition result and a second recognition result of the specific object, wherein the second recognition result of the specific object is based on the second plurality of captured images.

* * * * *